United States Patent [19]

Blomberg

[11] 4,061,212
[45] Dec. 6, 1977

[54] ROTATIONAL RATE OF CHANGE SENSOR

[76] Inventor: Folke Ivar Blomberg, Duvstigen 4, S-181 40 Lidingo, Sweden

[21] Appl. No.: 657,104

[22] Filed: Feb. 11, 1976

[30] Foreign Application Priority Data

Feb. 19, 1974 Sweden .............................. 7401882

[51] Int. Cl.$^2$ .............................................. B60T 8/04
[52] U.S. Cl. .............................................. 188/181 A
[58] Field of Search ............... 188/180, 181 A, 181 R; 303/20, 93, 94, 100, 102, 112, 113, 115, 117

[56] References Cited

U.S. PATENT DOCUMENTS 2,964,048  12/1960  Mortimer ..................... 188/181 A X
3,542,437  11/1970  Leiber ............................ 303/20 X Primary Examiner—Duane A. Reger
Attorney, Agent, or Firm—Bell, Seltzer, Park & Gibson

[57] ABSTRACT

A sensor responsive to the rate of change of changing rotational speeds of a rotatable element in which a flyweight is yieldably coupled with the rotatable element through an interconnecting element at any relative rotational position of the flyweight and interconnection for normal rotation thereof at a known ratio of rotational speed while accommodating decoupled rotation of the flyweight upon a change in rotational speed of the driving element at such a rate as to cause a torque in excess of a determinable threshold torque to act between the interconnection and the flyweight. During decoupled rotation, the flyweight is limited to deceleration at a controlled, substantially constant rate. Any occurrence of decoupled rotation of the flyweight is signalled as indicating that the rate of change of the changing rotational speed of the rotatable element exceeds a determinable rate. In the particular instance of an automotive vehicle wheel, the signalled occurrence indicates wheel slip and sensor signals may be used with an appropriate brake modulator for varying braking force.

78 Claims, 30 Drawing Figures

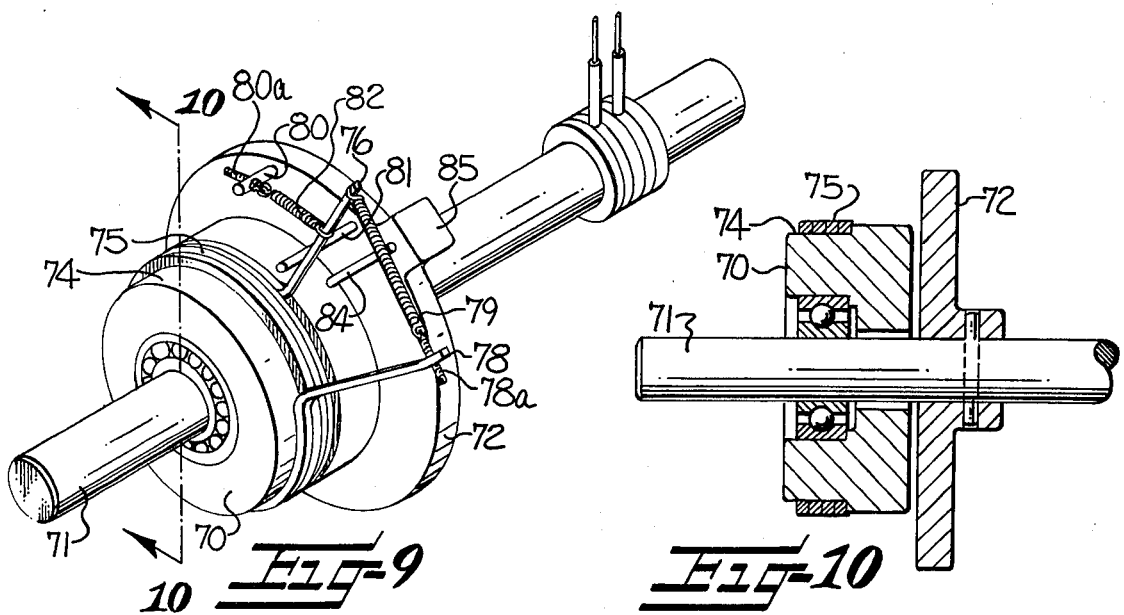
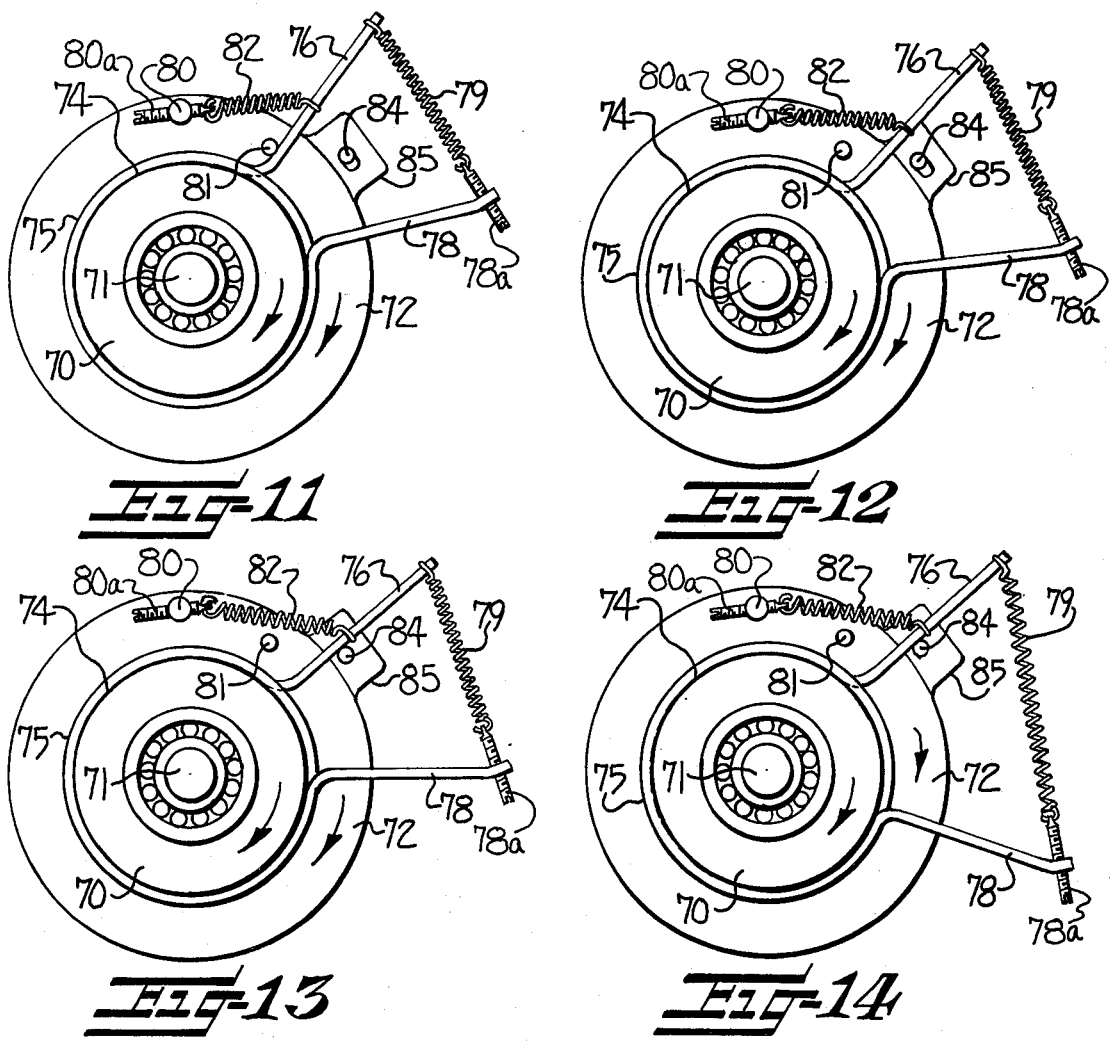

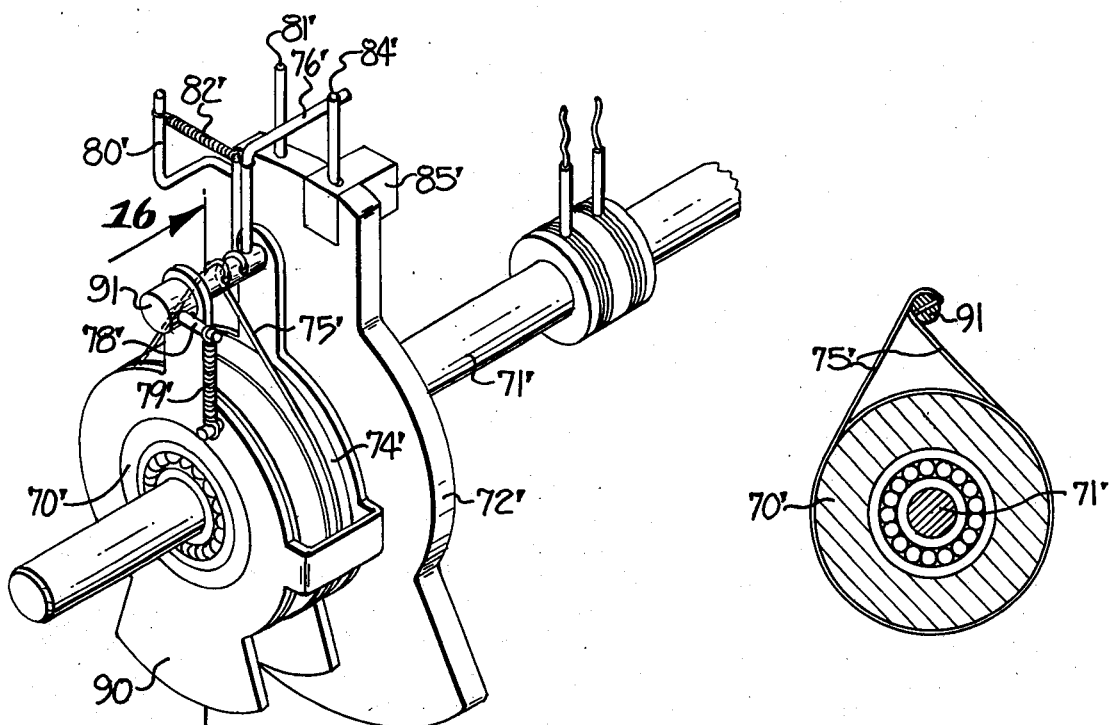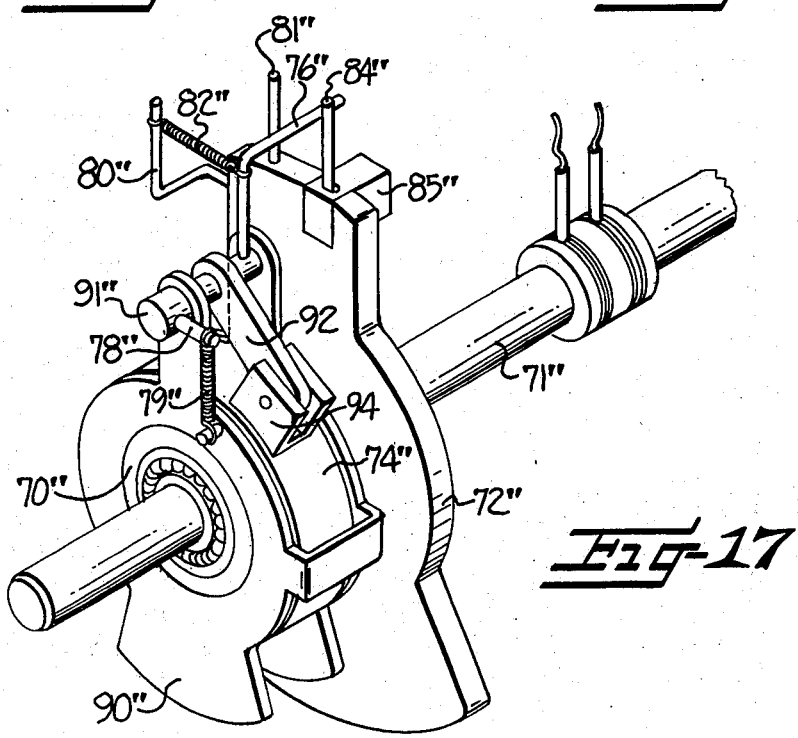

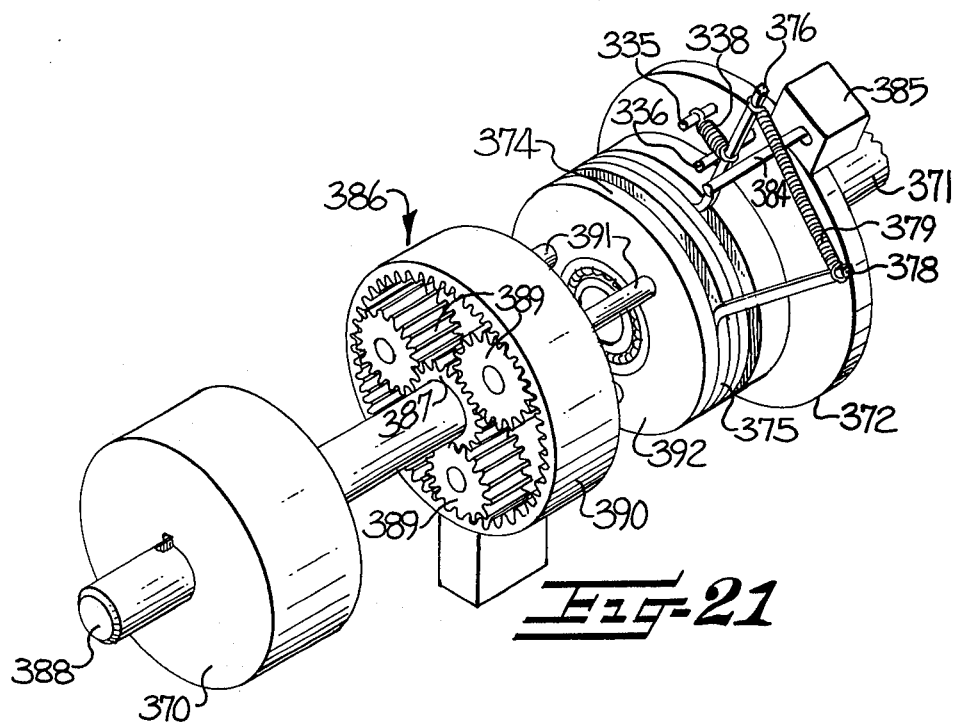
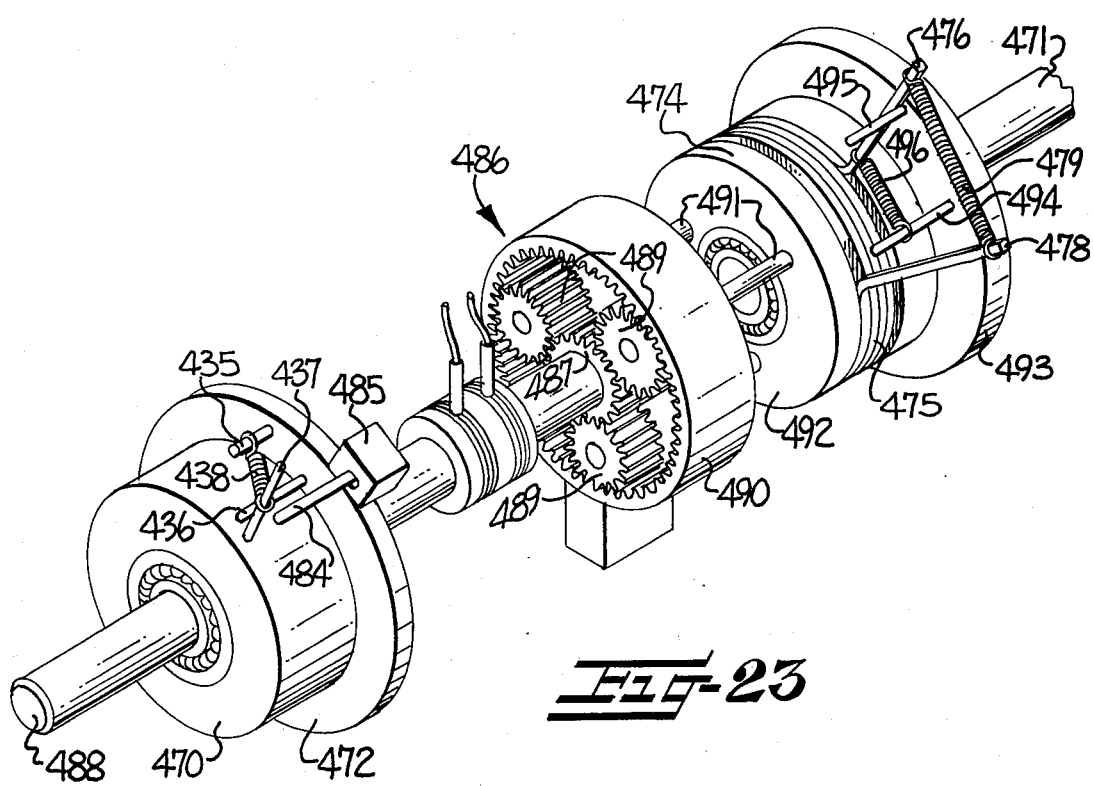

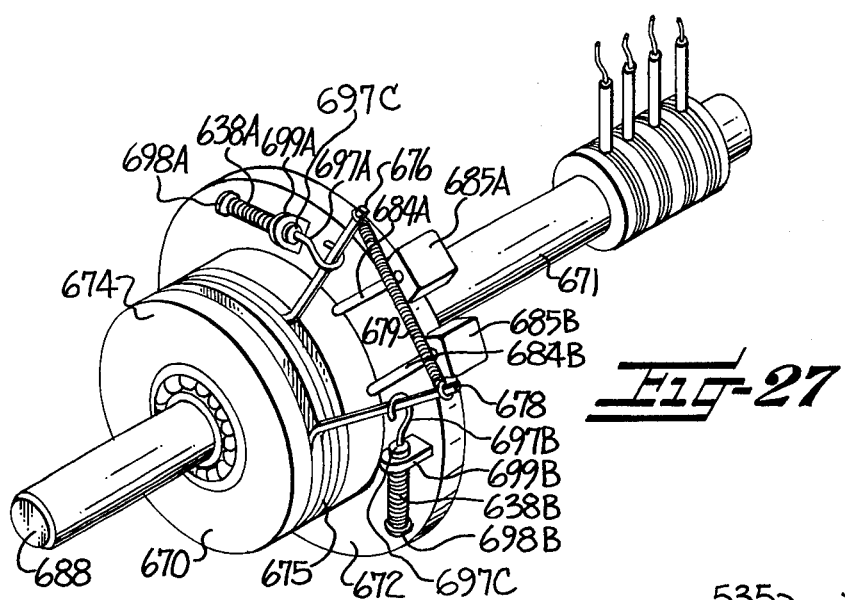
_FIG-27_
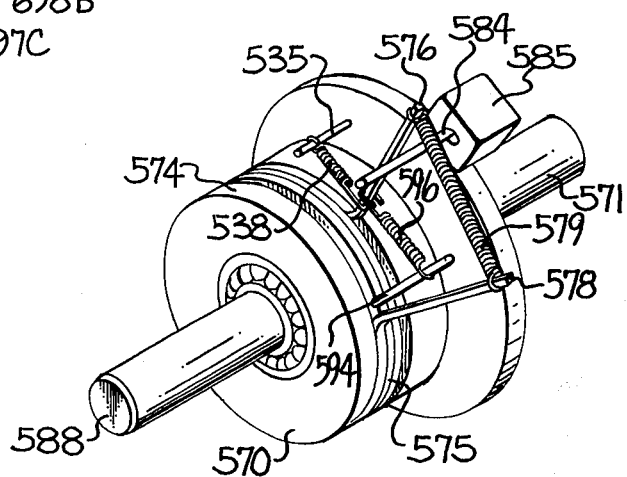
_FIG-28_
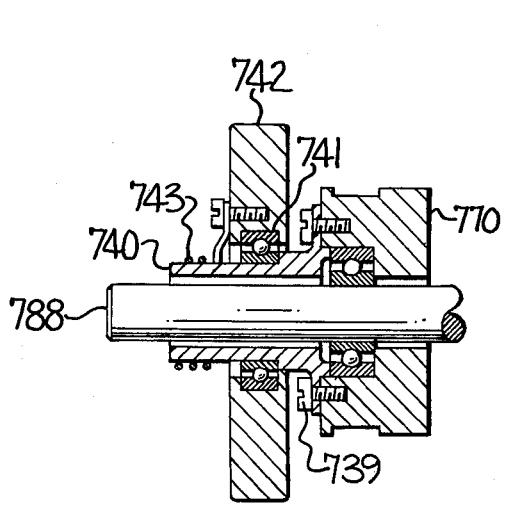
_FIG-30_
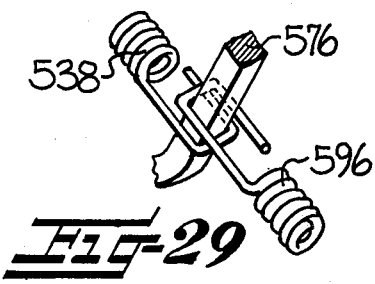
_FIG-29_

ROTATIONAL RATE OF CHANGE SENSOR

It is desirable or necessary in a number of apparatus and processes to sense the rate of change of changing rotational speeds of a rotatable element. One example of such a need is to be found in brake modulators for varying the braking effect exerted on a rotating wheel and the like, such as the arrangements found in U.S. Pat. No. Re. 28,562 and U.S. Pat. No. 3,833,097. A variety of approaches to sensing rates of change of changing rotational speeds and/or vehicle wheel slip are given in the latter of these two patents, in conjunction with description of a brake modulator. Other examples of the need to sense the rate of change of changing rotational speeds include arrangements for preventing the driving wheels of vehicles such as rail vehicles from reaching unpermissibly high rotational speeds, and arrangements for controlling starting and stopping processes of elevators and other similar conveyors.

While devices for responding to vehicle wheel slip and/or rates of change of changing rotational speeds have been known heretofore and operate successfully under varying conditions, some such devices (as will be described more fully hereinafter) give rise to certain risks and dangers under certain circumstances. Such risks and dangers will be described hereinafter with particular reference to the operation of an automotive vehicle, but will be understood by persons skilled in the applicable arts as relating to other and further control processes as have been briefly indicated above.

More particularly, achieving minimal braking distances while maintining directional stability and steerability of an automotive vehicle requie that the peripheral velocity of the vehicle wheels be maintained within a rather limited range in relation to the velocity or speed of the vehicle. This ratio normally is designated as "slip" and, as an explanatory example, it is noted that slip is 20% where the peripheral velocity of the wheels equals a vehicle forward speed of 40 miles per hour and the actual vehicle forward speed is 50 miles per hour. Extensive empirical experience shows that ideal slip values for automotive vehicles with pneumatic tires are in the range of from about 10% to about 30%, with some variation depending upon road conditions.

Slip values in excess of about 30% seriously endanger directional stability of automotive vehicles. Such loss of directional stability occurs both where slip is negative, as upon braking, and where slip is positive, as upon application of a driving moment exceeding the available frictional force at the contact surface between the wheels and the road. It has further been noted that an automotive vehicle requires a markedly lower slip value for the rear wheels that for the front wheels in order to maintain good directional stability.

It will be understood that sensors responsive to wheel slip and/or the rate of change of changing rotational speeds of a rotatable element are an important element of any system proposing to attain full control of braking and driving processes. Heretofore, two general approaches have been employed for such sensors, with one being based upon an electrical, mechanical, hydraulic or pneumatic comparison of impulses and the other being based upon mechanical principles involving the use of a flyweight. The latter approach (as shown for example by the sensor of FIGS. 9 and 10 of U.S. Pat. No. 3,833,097) has frequently involved a flywheel substantially restrained to rotation with a driving element and interconnected therewith by a pre-tensioned control spring in such a manner that the spring force is overcome at a certain determinable rate of change of changing rotational speed and the flywheel is permitted to move through a small angle to operate a switch, valve, or the like. The restraint of the flywheel against movement beyond the relatively small angle causes such a sensor to operate essentially as a two-position device under conditions of high percentage slip, introducing substantially risk that a relatively slowly responding control will be rendered ineffective by a very short duration signal from the sensor.

By way of further explanation, it would be noted that a sensor such as that of FIGS. 9 and 10 of U.S. Pat. No. 3,833,097 may form a portion of an anti-locking arrangement for a fluid pressure actuated brake. In the event that a braking force which is excessive with regard to road friction is applied very quickly, the rotational speed of the vehicle wheel will be reduced at a rate of change giving rise to a torque in excess of the torque exerted by the control spring of the sensor, thereby causing the sensor to signal that anti-locking effort is required. If the brake modulator receiving such a signal responds relatively slowly, the vehicle wheel will have become completely stopped before the braking force has been reduced, so that the signal from the sensor will be interrupted and the vehicle wheel will not rotate again, unless some action is taken to release the brake. In this sequence of events, the sensor is not exposed to any rate of change of changing rotational speeds of the vehicle wheel while the unbraked vehicle is going at a substantially constant speed. During excessive braking, the sensor is exposed to a very high rate of change and only succeeds in sending a very brief signal. Immediately thereafter, the vehicle wheel becomes stationary, the sensor is no longer actuated by any rate of change of changing rotational speeds, and no signal is emitted.

Where the sensor is employed to sense the rate of change of increasing rotational speeds, the conditions are essentially reversed. A vehicle equipped with such control may be driven at a substantially constant speed by a driving force applied by driving wheels. Under such conditions, the sensor is not acted upon by any rate of change of changing rotational speeds which give rise to any control signal. If an excessive driving force is applied, the rotary speed of the vehicle wheel begins to increase without a corresponding increase in the speed of the vehicle and, in the event such an excess driving force is sufficiently large, the rate of change of changing rotational speeds of the drive wheel may be such that the wheel may be accelerated to a higher constant rotary speed so quickly that the duration of any signal from such a sensor will be so short as to prevent effective control.

With the above discussion in mind, it is an object of the present invention to provide a sensor responsive to rates of change of changing rotational speeds of a rotatable element which is not subject to the difficulties and deficiencies of prior sensors. In realizing this object of the present invention, a flywheel and an interconnection for the flyweight are coupled together in such a manner as to accommodate any relative rotational positioning thereof and to accommodate decoupled rotation of one of the interconnection and the flyweight relative to the other, upon a change in rotational speed at such a rate as to cause a torque in excess of a determinable threshold torque to act between the interconnection and the flywheel while limiting the rate of deceleration of the decoupled flyweight to a controlled, substantially constant rate.

Yet a further object of the present invention is the prolongation of the signalled occurrence of a rate of change of changing rotational speed of a rotatable element. In accomplishing this object of the present invention, a sensor is operated in accordance with a method including cycles of decoupling and recoupling to obtain a response other than the response of an essentially two-position device. That is, the response period is extended over an interval of time to facilitate coordination of the sensor of the present invention with a relatively slowly responding control.

Yet another object of this invention is control of vehicle wheel slip to a desired limited range of values so as to preclude skidding or uncontrolled lateral movement while facilitating minimization of stopping distance. In accomplishing this object of the present invention, a closely controlled torque resisting rotation of the flyweight is applied to the flyweight during decoupled rotation thereof so as to limit the rate of deceleration of the decoupled flyweight to a controlled, substantially constant rate which establishes a limit for wheel slip.

A further object of the present invention is the accomplishment of differentiation between rates of change of increasing rotational speeds of a rotatable element and rates of change of decreasing rotational speed of a rotatable element. In accomplishing this object of the present invention, elements of a two-direction sensor are arranged and selected to provide controlled and variable thresholds for actuation on acceleration and deceleration.

Some of the objects of the invention having been state, other objects will appear as the description proceeds, when taken in connection with the accompanying drawings, in which:

FIG. 9 is a perspective view of a sensor in accordance with one form of the present invention;

FIG. 10 is an elevation view, partially in section, through a portion of the sensor of FIG. 9, taken substantially along the line 10—10 in FIG. 9;

FIGS. 11, 12, 13 and 14 are end elevation views of the sensor of FIG. 9, showing successive states of the sensor during the operation thereof;

FIG. 15 is a view similar to FIG. 9 of a modified form of the sensor of FIG. 9;

FIG. 16 is a partial sectional elevation view through the sensor of FIG. 15, taken substantially along the line 16—16 in FIG. 15;

FIG. 17 is a view similar to FIG. 15 of another modified form of the sensor of FIG. 9;

FIG. 21 is a view similar to FIG. 20 of another modified form of the sensor of FIG. 19;

Figure 22:
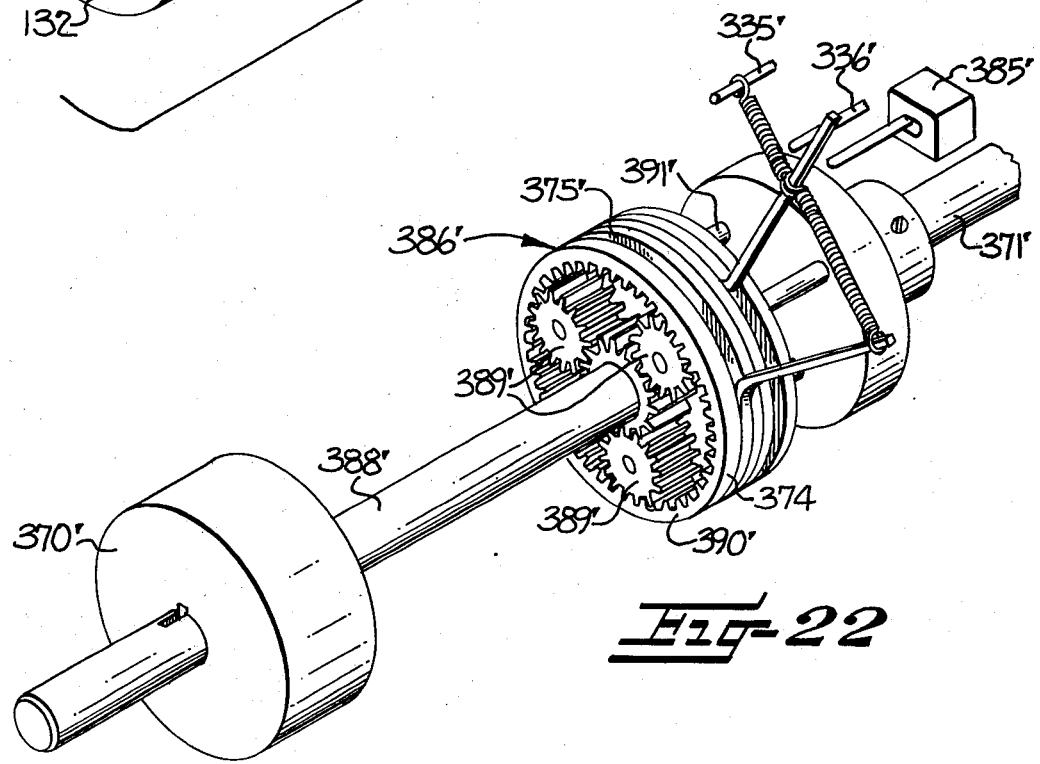
FIG. 22 is a view similar to FIG. 21 of another modified form of the sensor of FIG. 19.
Figures 19, 20:
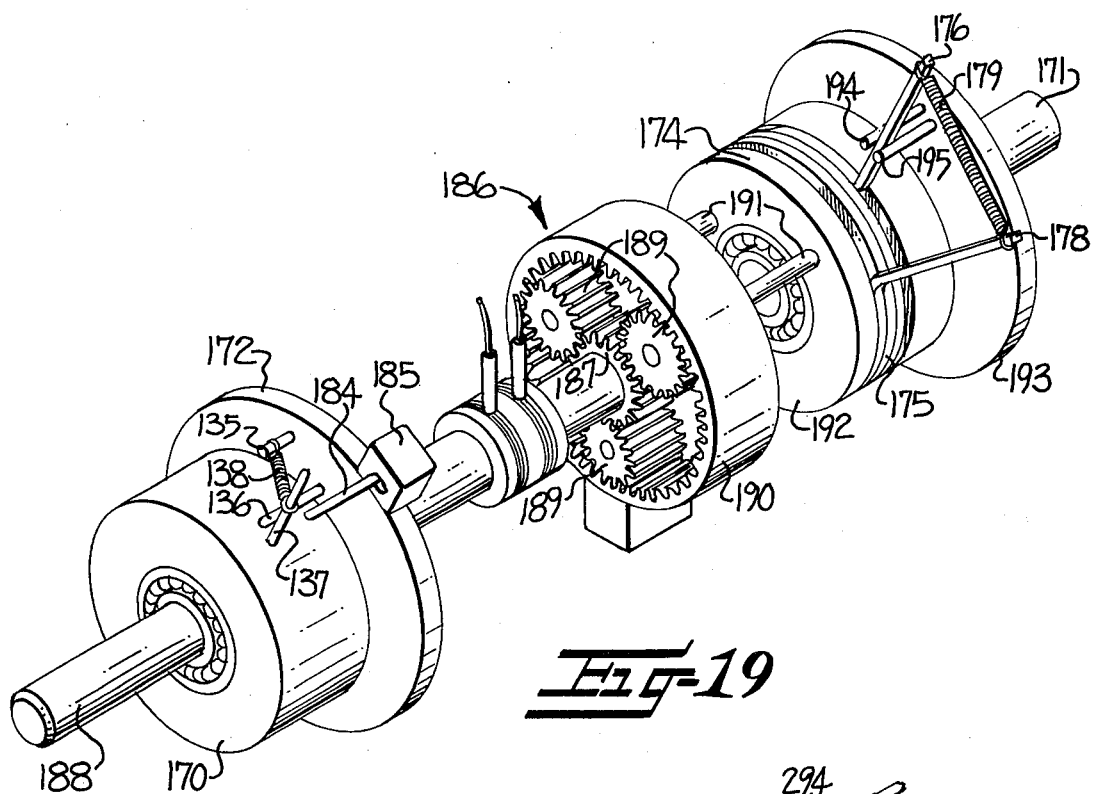
FIG. 19 is a view similar to FIG. 9 of another form of sensor in accordance with this invention.
FIG. 20 is a view similar to FIG. 19 of a modified form of the sensor of that FIG.
Figure 24:
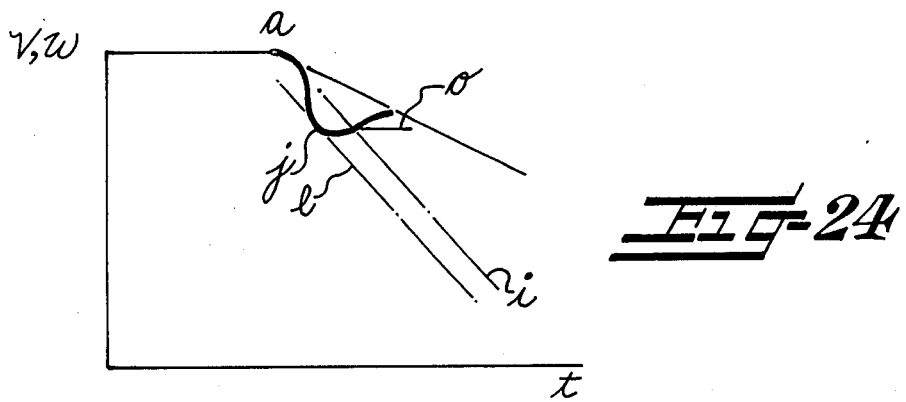
Figure 25:
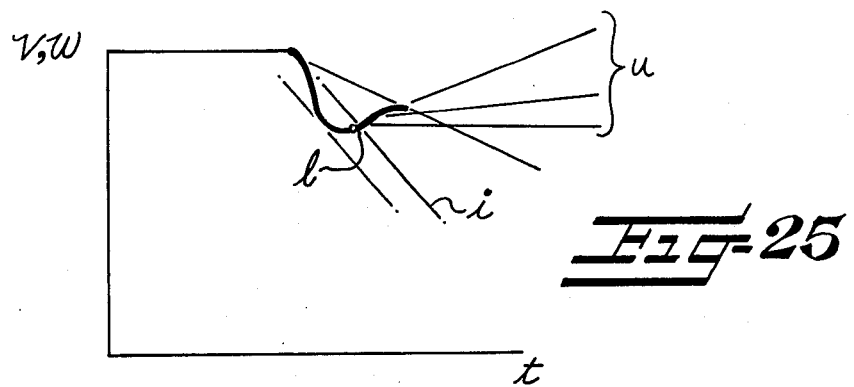
Figure 26:
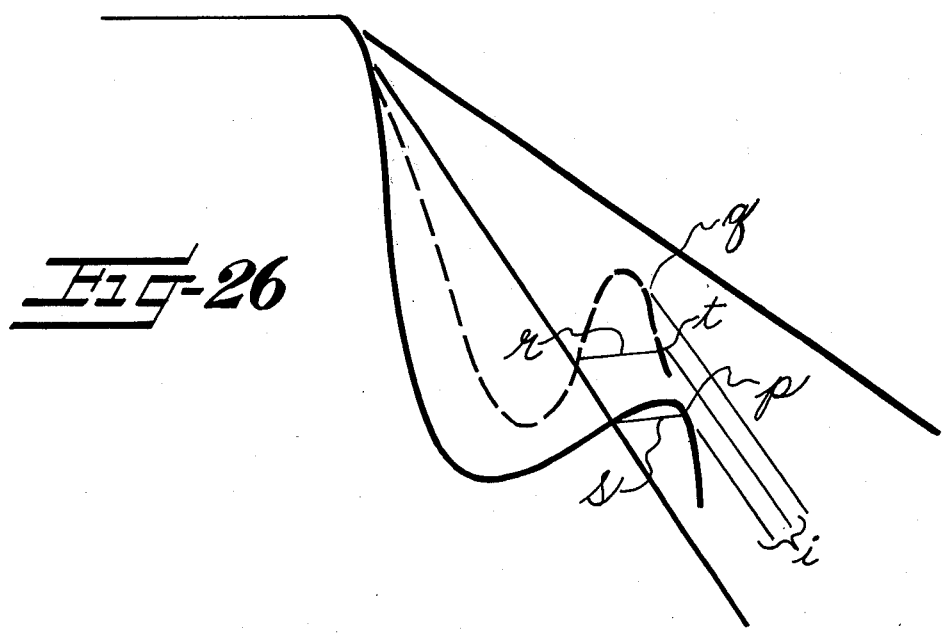

FIG. 23 is a view similar to FIGS. 20 through 22 of another modified form of the sensor of FIG. 19; FIGS. 24, 25 and 26 are diagrams similar to those of FIGS. 6 through 8;

FIG. 27 is a view similar to FIG. 9 of another form of sensor in accordance with this invention;

FIG. 28 is a view similar to FIG. 9 of yet another form of sensor in accordance with this invention;

FIG. 29 is an enlarged perspective view, partially in section, of a portion of the sensor of FIG. 28; and FIG. 30 is a view similar to FIG. 10 of yet another form of sensor in accordance with this invention.

Figure 1:
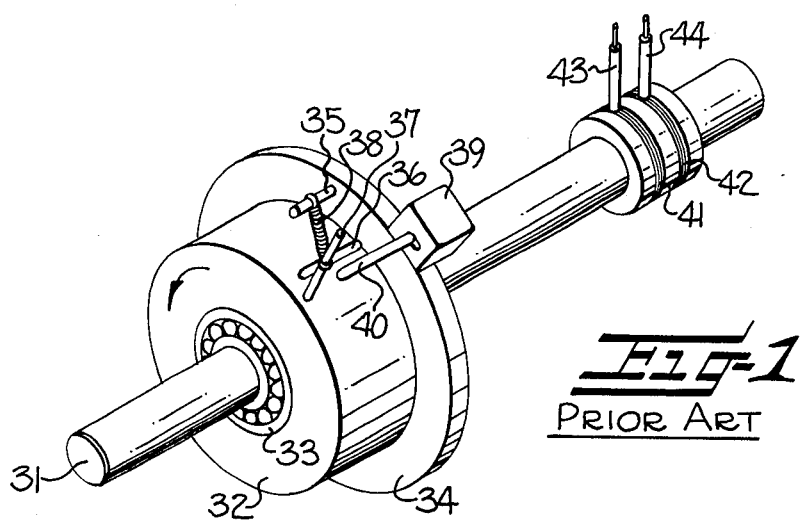
FIG. 1 is a perspective view of one form of prior art sensor responsive to the rate of change of changing rotational speeds of a rotatable element.

Referring first more particularly to those prior known sensors exemplified by the arrangement of FIG. 1, it has heretofore been known to provide drive means operatively connected with a rotatable element such as a vehicle wheel. Such a drive means may take the form of a shaft 31, driven at the rotational speed of the rotatable element or driven in proportion to such a rotational speed by means of an appropriate gear set or other transmission. A flyweight, shown in the form of a flywheel 32, is rotatably supported on the shaft 31 by suitable bearing means, such as an antifriction ball bearing. The outer race 33 of the ball bearing is fixed to the flywheel 32, with the inner race thereof being fixed to the shaft 31 by suitable means such as a press fit or locking rings (not shown). A disc member 34 is fixed to the shaft 31 adjacent the flywheel 32, for rotation with the shaft. A pair of pins 35, 36 extend axially from the disc 34 parallel to the shaft 31 and adjacent a circumferential surface of the flywheel 32, from which a radially directed pin 37 extends. The engagement of two pins 36, 37 respectively on the disc 34 and the flywheel 32 restrains relative rotation of the flywheel 32 with respect to the disc 34 and shaft 31. Suitable biasing means, shown in the form of a coil spring 38, acts between the disc 34 and flywheel 32 for determining an initial setting torque required to cause rotation of one of the disc 34 and flywheel 32 relative to the other thereof. As shown, the initial setting spring 38 is inserted between the pin 37 on the flywheel 32 and one pin 35 on the disc 34 so as to tend to rotate the flywheel 32 in a counterclockwise direction relative to the shaft 31 (as indicated by the arrow) until the pin 37 on the flywheel 32 abuts the other pin 36 on the disc 34.

The sensor of FIG. 1 additionally includes means such as a microswitch 39 having an actuating arm 40 positioned to be contacted by the pin 37 carried by the flywheel 32 upon rotation of one of the disc 34 and flywheel 32 relative to the other thereof which causes relative turning of the flywheel 32 in a clockwise direction (opposite the direction of the arrow). By suitable electrical conductors, the microswitch 39 is connected to slip rings 41, 42 and corresponding brushes 43, 44 so that the microswitch 39 can transmit to a suitable brake modulator (not shown) information concerning the rate of change of changing rotational speeds of the shaft 31 and the rotatable element to which the shaft is connected.

As will be known to persons familiar with prior art sensors, the electrical arrangements employed may be simplified by employing the shaft 31 as one of two conductors and dispensing with one of the slip rings and the corresponding brush. Further, the microswitch 39 may be replaced by a pin electrically insulated from the disc 34 and having the same location as the actuating arm 40 of the microswitch. Other and further possible simplifications will be recognized by persons skilled in the applicable arts.

As will be understood, a prior art sensor as illustrated in FIG. 1 and described hereinabove functions as an acceleration sensor if it rotates counterclockwise (in the direction of the arrow) and as a deceleration sensor if it rotates in a clockwise direction (opposite the direction of the arrow). When the sensor is operating as an acceleration sensor and is subjected to a changing rotational speed, the flywheel 32 will rotate with the same speed as the shaft 31 and disc 34 for so long as the rate of change of changing rotational speed does not give rise to a torque acting between the disc 34 and flywheel 32 which has a magnitude greater than the torque exerted by the tensioning force of the initial setting spring 38. If such a threshold torque is exceeded, as when the rate of change becomes excessively steep, the flywheel 32 rotates relative to the disc 34 in a counterclockwise direction (opposite the direction of the arrow) for the relatively short motion permitted until the radial pin 37 contacts the actuating arm 40 of the microswitch 39 to close the microswitch. As will be understood, a reversal of structural connections will cause the sensor of FIG. 1 to operate as a deceleration sensor.

The threshold torque referred to hereinabove can be calculated by determining the sum of inertial moments about the rotational axis of the shaft 31 for the flywheel 32, radial pin 37, ball bearing outer race 33, and the contribution of the ball array of the ball bearing (in which the balls rotate about their own axis of symmetry and at one-half the speed of the flywheel 32). The limit value of rate of change of changing rotational speeds is achieved when it amounts to values which, when multiplied with the inertia as so calculated, yield a moment exceeding the moment exerted by the initial setting spring 38 at its point of interconnection with the radial pin 37.

Figure 2:
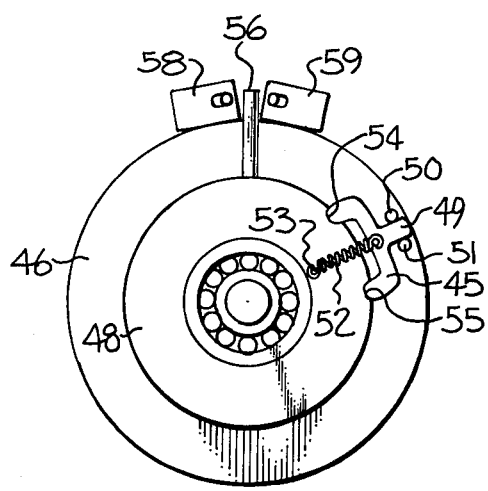
FIG. 2 is an end elevation view of a second form of sensor responsive to the rate of change of changing rotational speeds of a rotatable element.
Figure 3:
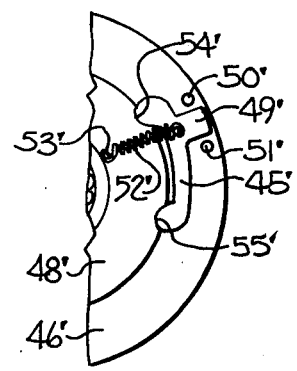
FIG. 3 is a partial elevation view showing a modification of the sensor of FIG. 2.
Figure 4:
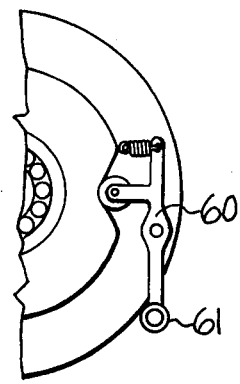
FIG. 4 is a view similar to FIG. 3 showing a further modification of the sensor of FIG. 2.

The devices of FIGS. 2 through 4 reflect further developments of the sensor of FIG. 1. The sensor of FIG. 2 is distinguished from that of FIG. 1 in that a yoke 45 is provided for limiting the relative rotational positions at which a disc 46 and flywheel 48 are coupled. More particularly, the yoke 45 includes a radially outwardly extending projection 49 which is captured between two pins 50, 51 extending axially of the disc 46. Further, a radially acting initial setting coil spring 52 connected between the yoke 45 and an axial pin 53 extending from the flywheel 48 holds the yoke in engagement with two axial grooves 54, 55 in the flywheel 48. A radial pin 56 extending from the flywheel 48 cooperates with a pair of microswitches 59, 59 in order to provide signals of occurrences of excessive rates of both acceleration and deceleration.

It will be noted that the sensor of FIG. 2 is fully symmetrical. Thus, when the threshold torque established by the initial setting spring 52 is overcome, the yoke 45 is lifted out of the corresponding one of the two grooves 54, 55 depending upon the direction of relative rotation imminent between the disc 46 and flywheel 48. In such an event, the flywheel 48 rotates relative to the disc 46, causing the radial pin 56 to close one or the other of the microswitches 58, 59.

The arrangement of FIG. 3 is substantially similar to FIG. 2 but provides a non-symmetrical yoke 45' thereby distinguishing between the rate of change signalled on acceleration and the rate of change signalled on deceleration. Such a possibility of distinguishing differing determinable threshold torques is essential in sensors to be used on an automotive vehicle or the like to assure both that wheel slip does not reach undue values during braking and that excessive driving moments are not applied. In the specific instance of an automotive passenger vehicle, the desired threshold torque for sensor signalling during braking is approximately twice that of the desired threshold torque for sensor signalling during acceleration, in part due to the activity of all four wheels during braking and of only two during acceleration.

Figure 5:
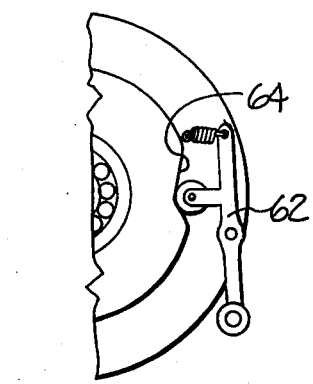
FIG. 5 is a view similar to FIG. 4 showing a further modification of the sensor of FIG. 2.

Further modifications of the sensor of FIG. 2 may provide for a pivoted yoke 60 (FIG. 4) having a counterweight 61 adapted to compensate for any effect of centrifugal forces; and a similar yoke 62 (FIG. 5) acting in a notch or groove 64 which has differing slopes for distinguishing differing threshold torques.

Turning more particularly to the present invention, it has been discovered that the difficulties and deficiencies of prior art arrangements such as that of FIG. 1 are overcome by providing rotatable means operatively interconnecting the rotatable element or vehicle wheel and a flyweight such as the flywheel 32 of the prior art arrangements. In accordance with the present invention, the interconnecting means yieldably couples the rotatable element and flyweight at any relative rotational position of the flyweight and controllably decouples and recouples with the flyweight. By comparison with the prior art sensor of FIG. 1, it is as though the radial pin 37 was not firmly attached to the flywheel 32 but shiftable around the flywheel 32 against a certain predetermined torque. More particularly, the interconnecting means of this invention comprises control means for limiting the rate of deceleration of the decoupled flyweight to a controlled, substantially constant rate, which desirably is accomplished by the imposition on the rotating decoupled flyweight of a substantially constant torque resisting rotation thereof. Such a device in accordance with the present invention avoids the "deception" of a control system as described hereinabove with particular reference to sensor such as that of FIG. 1.

Figure 6:
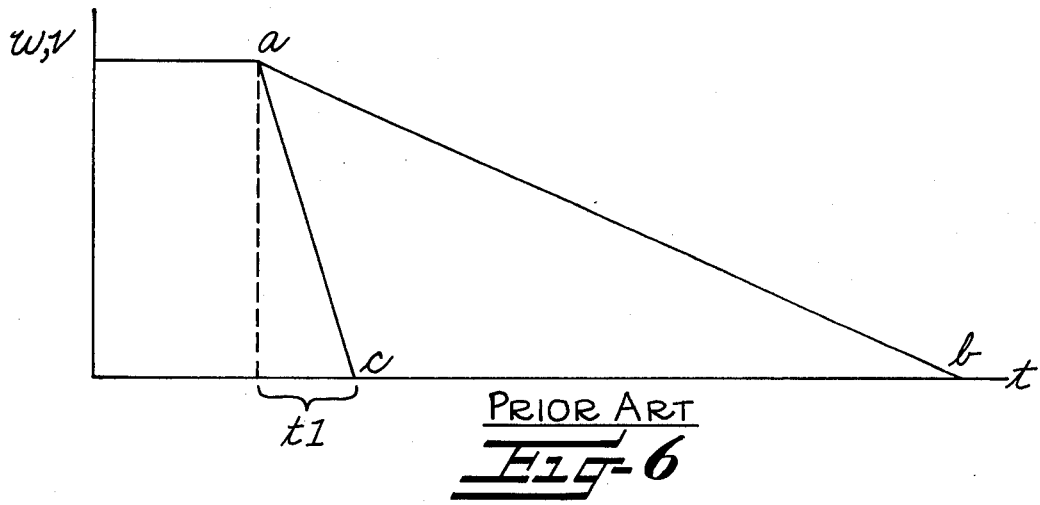
FIGS. 6, 7 and 8 are diagrams illustrating the course of events during deceleration of the rotational speed of a rotatable element.
Figure 7:
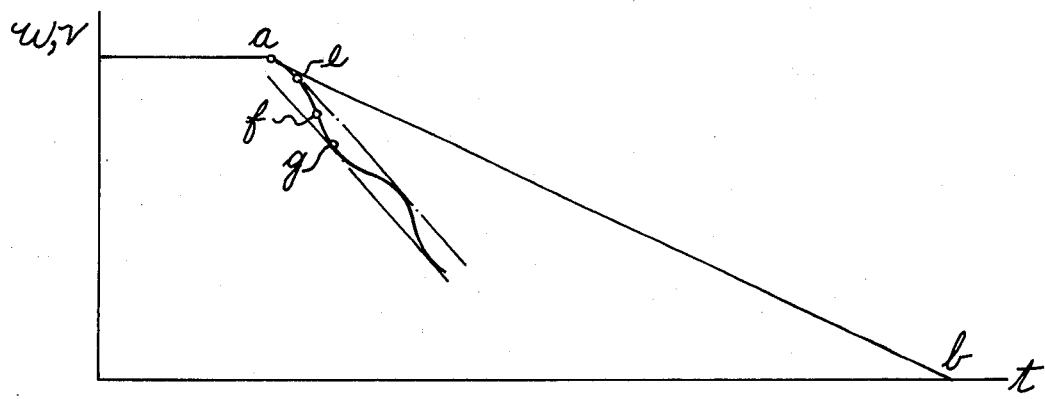
Figure 8:
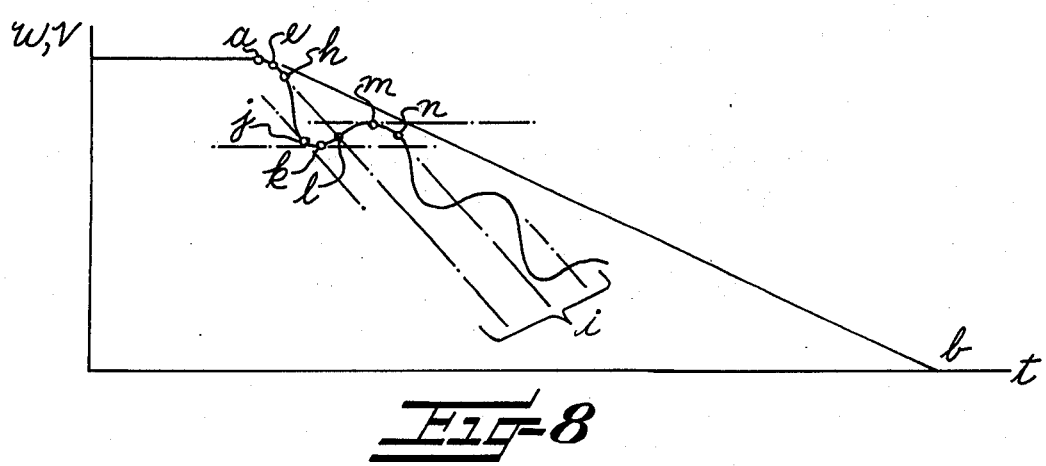

Such failure of desired control functions and avoidance thereof by the present invention can be made more clear by reference to diagrams of the braking process of a vehicle, as set forth in FIGS. 6 through 8. In each diagram, the vertical axis indicates both the speed $v$ of the vehicle and the rotational speed $\omega$ of a vehicle wheel, while the horizontal axis indicates the time $t$. As indicated in each Figure, a vehicle moves at a substantially constant velocity for an initial time period, braking is initiated at the time indicated at $a$ and the vehicle has come to a standstill at the time indicated at $b$. The inclination of the line $a$–$b$ is a measure of the rate of deceleration of the vehicle, shown to be constant by the straight characteristic of the line $a$–$b$. As will be understood, the rate of deceleration may vary with time and, in such circumstances, the line $a$–$b$ will be curved in various ways. As will also be understood, the slope of such lines reflects the relative rate of change, with higher magnitude rates of change being indicated by more steep slopes. Slope may be negative (showing deceleration) or positive (showing acceleration).

As will be recognized, the rotational speed of the vehicle wheel corresponds to the velocity of the vehicle prior to initiation of braking at $a$, indicating that there is 0% slip. In FIG. 6, line $a-c$ indicates the behavior of a wheel which has imposed thereon, during the braking process, a braking force or moment which is considerably greater than that permitted by the friction of the wheel against the road surface. The wheel is thereby subjected to a violent rotational deceleration at an excessively steep rate of change and has reached zero rotational velocity and 100% slip at point $c$, in spite of the fact the speed of the vehicle still is considerable. Thus, line $a-c$ illustrates what can happen when an excessive braking force or moment is applied under conditions involving a slippery road surface and also illustrates an instance in which an automatic brake control system is "deceived" because the wheel stops rotating within the short time period of $t_1$ indicated in the diagram. The time $t_1$ corresponds to the signalling of an excessive rate of deceleration by a sensor such as that of FIG. 1 and is so short that a brake modulator can not react sufficiently quickly to reduce the braking force, interrupt the violent rotational deceleration of the wheel, and permit an acceleration so as to cause the peripheral speed of the wheel to approach the speed of the vehicle.

If it is assumed for purposes of discussion that a modulator is available which reacts to a sensor such as that of FIG. 1 sufficiently quickly to reduce the braking force prior to the point $c$ (FIG. 6) being reached, the braking process would be that illustrated in FIG. 7. On the curves there shown, the rotational deceleration of the wheel and thereby the sensor has just reached the initial setting torque at the point $e$, and immediately thereafter the modulator begins operating in response to the sensor. However, due to slow modulator response, the wheel will continue to lose speed with a successively increasing deceleration (the slope of the curve $a-e-f$ becomes more negative or the inclination thereof continues to increase). At a point where the brake control becomes effective, shown at $f$, the braking force acting on the wheel begins to decrease and the rotational deceleration to which the wheel is subjected changes to a differing rate of change. At a subsequent time, indicated at $g$, the rate of deceleration of the wheel again changes so that the torque exerted in the sensor drops to less than the initial setting torque, causing the signal from the sensor to cease and permitting the braking force to be restored. As will be apparent from the curves of FIG. 7, the rotational speed of the vehicle wheel will inevitably go toward a 100% slip circumstance, by progression along a cyclical retardation curve.

Certain sensor arrangements have attempted to overcome the difficulty just pointed out by reference to FIG. 7 by providing delaying devices of various types, such as electronic holding circuits or frictional clutches and decoupleable flyweights but have failed for at least two reasons. First, the resulting braking distance for the vehicle is longer than the optimal braking distance as the delay imposed or signal prolongation must be at least sufficient to permit a brake modulator to react to the highest braking force and most extremely slippery road surface which, if no delay is imposed, would mean the speed of the wheel would very quickly reach zero or 100% slip. Necessarily, this imposes longer than desirable braking distances under better road conditions and, in many instances, longer distances than those obtainable with completely locked wheels or by a very clever driver of a vehicle having first class brakes. Second, the extremely poor slip control evidenced by elongated stopping distances jeopardizes directional stability of the vehicle. As noted above, the present invention not only avoids the difficulties shown in FIG. 7 but also accomplishes control over slip values.

The general characteristics of a sensor in accordance with the present invention have been briefly set forth above and a braking process in accordance with the present invention is illustrated in FIG. 8. As there shown, braking is initiated at $a$ and a wheel is retarded in a manner similar to that described above with reference to FIG. 7 toward a time $e$ where the initial setting torque of a sensor is just reached. However, the sensor in accordance with the present invention functions differently from such a point in time. More particularly, at a time indicated at $h$, immediately after the time indicated at $e$, the initial setting torque of the sensor in accordance with this invention has been just exceeded. However, due to the use of a yieldable coupling means (as described more fully hereinafter), the flyweight means of a sensor in accordance with this invention is decoupled and continues to decelerate at a rate of deceleration which substantially describes a straight line $i$ while the vehicle wheel (which is the sensed rotatable element) decelerates with an increasing rate of change along a continued downwardly curving line until such time (about at $j$) that the modulator becomes effective to reduce the braking force applied to the wheel and the rate of deceleration of the vehicle wheel reverses to become, at a time indicated at $k$, a rate of acceleration. The slope of the line $i$ is controlled by a torque control setting as will be described hereinafter, and represents a controlled, substantially constant rate of deceleration of the flyweight means which establishes a limit for wheel slip.

A comparison of the sequence of events represented in FIGS. 7 and 8 shows that the signal from a prior art sensor (FIG. 7) is interrupted as soon as the rate of change subjects the sensor to a torque less than the initial setting torque, as at $g$ in FIG. 7, while interruption of signalling by the sensor of the present invention is not determined by when the limiting rate of change is again reached but rather by the time at which the means interconnecting the flyweight with the driving rotatable element (or wheel) has accelerated back up to a known ratio of rotational speed to the simultaneous rotational speed of the flyweight. Such a known ratio may be 1:1 or some other geared-up or geared-down ratio such as 5:1 or 1:5. In the sequence of events diagrammed in FIG. 8, this occurs at $l$, where the flyweight recouples with the interconnecting means and the signal from the sensor ceases. The modulator then again increases the braking force exerted on the wheel, and the rotational speed of the vehicle wheel diminishes at an increasing rate of change. As diagramed, the positive rate of change of changing rotational speed of the wheel (or slope of acceleration) reaches zero at $m$ and the negative rate of change of the changing rotational speed of the wheel again causes the sensor to signal at $n$. The process of decoupling, flyweight deceleration at a controlled rate and recoupling is repeated until the vehicle has come to a standstill or there is no further need for braking. From FIG. 8, it is apparent that the rotational speed of the vehicle wheel will fluctuate up and down cyclically, describing a line extending immediately below the line representing the speed of the vehicle. Thus, the present invention results in a slip percentage varying with time and having a mean value which, by correct choice of a torque control setting for the sensor, can be predetermined within narrow limits. In an automotive passenger vehicle, the ideal range of from 10 to 30% slip mentioned hereinabove can be maintained without difficulty.

While the diagrams of FIGS. 6 through 8 relate particularly to braking functions, it is believed apparent that the sensor of the present invention has a corresponding function when used in a system for the control of an applied driving moment on a vehicle drive wheel.

An alternate characterization of the braking events diagramed in FIG. 8 reflects that a sensor in accordance with the present invention acts as a mechanical memory. On the curves of FIG. 8, the rotational speed of the flyweight and of the means interconnecting that flyweight with a wheel start differentiating at $h$, at which time the rotational speeds of the flyweight and its drive means are equal (or in a known ratio of 1:1 for the specific example now being described) and slightly below the rotational speed of a wheel or rotational element which would correspond with the vehicle's speed, i.e. a point on line $a$–$b$ immediately above $h$. Beyond this time, the rotational speed of the interconnecting means decreases quickly whereas the speed of the flyweight decreases more slowly. Thus it may be said that the flyweight "remembers" its own rotational speed (and that of the vehicle wheel) as at $h$ and, from this starting point, the rotational speed of the flyweight decreases at a rate corresponding to the slope or incline of line $i$ and caused by the moment of inertia of the flyweight and a controlled torque exerted between the flyweight and the interconnecting means. As described hereinabove, the sensor in accordance with this invention continues to emit an uninterrupted signal until the interconnecting means returns to the known ratio of rotational speed with the flyweight, after which the sequence of events is repeated and the flyweight then adopts a new reference starting rotational velocity at $n$.

Having described the principles of operation of a sensor in accordance with this invention, reference will now be had to FIGS. 9 through 14, illustrating one embodiment of the present invention in a series of positions corresponding to points along the curves of FIG. 8. Referring now more particularly to FIG. 9, the flyweight means of a sensor in accordance with the present invention preferably takes the form of a flywheel 70 mounted for rotation relative to a drive means in the form of a shaft 71. The flywheel 70 is operatively interconnected with a disc 72 by a yieldable coupling means for selectively decoupling and recoupling the flyweight, preferably in the form of band means wound helically about a circumferential surface 74 of the flywheel 70. In the form illustrated, the band means comprises a helically wound coil 75, the ends of which are outwardly bent to form two substantially radially directed arms 76, 78. Between the ends of the radially directed arms 76, 78, a coil spring 79 is inserted for urging the arms 76, 78 towards each other. The coil spring functions to provide a torque control setting which may be adjusted by suitable means such as a threaded screw 78a penetrating one arm 78.

Desirably, the inner diameter of the coil 75 is suitably slightly larger than the diameter of the circumferential surface 74 of the flywheel 70 (which the spring encircles) in the absence of the biasing force exerted by the torque control spring 79. As will be understood, the exertion of force drawing together the arms 76 and 78 of the coil 75 reduces the inner diameter of the band means, causing the band means to be tightened about the circumferential surface 74 of the flywheel 70. Thus, the band means is capable of functioning as a yieldable interconnecting means coupling with the flywheel at any relative rotational position of the flywheel.

The principle of the yielding interconnection thus provided will be easily understood from a consideration of the formula $P = Qe^{\mu\alpha}$ which expresses certain relationships involving a rope or the like wound about a cylinder and involving the magnitude of a force amplification obtained in such an arrangement. In this formula:

$e$ = Base of the natural logarithm system
$\mu$ = The frictional coefficient between rope and cylinder
$\alpha$ = Total angle expressed in radians by which the rope embraces the cylinder
$e^{\mu\alpha}$ = The amplification factor Thus, if one end of the rope is held with the force Q, the force P on the other end is required to cause the rope to slide around the cylinder.

In the context of the present invention, where the coil 75 functions as a portion of a yieldable interconnecting means, it will be understood that the coil can be given such a number of helical turns and such dimensions, including selection of the length of the arms 76, 78 and the free internal diameter in relation to the diameter of the circumferential surface 74, that the force exerted by the torque control spring 79 can be determined to render the band means self-locking if an attempt is made to turn the band means counterclockwise (when viewed as is FIG. 11, for example) by acting on one arm 78 or if an attempt is made to turn the band means clockwise (when similarly viewed) by acting on the other arm 76, inasmuch as the band means will be wound more tightly about the circumferential surface.

However, when an attempt is made to turn the band means clockwise by acting on the one arm 78 or counterclockwise by acting on the other arm 76, such an attempt will be successful upon a force being applied which is capable of overcoming the resisting force of the torque control spring 79. Upon overcoming such torque control force, the band means starts unwinding from the circumferential surface 74 and accommodates relative rotation between the flywheel 70 and the disc 72 as a stick-slip frictional coupling. As will be understood, such decoupling and recoupling occurs irrespective of the relative rotational positions between the flywheel 70 and the disc 72.

As noted hereinabove, the flywheel 70, when decoupled, slows or decelerates along a relatively straight line $i$. The rate of change of rotational speed of the flywheel 70 during such time (or the slope of the line $i$) is determined by the moment of inertia of the flywheel, the placement of the spring 79, and the force exerted by that spring and therefore design, selection or adjustment of these characteristics of a sensor in accordance with this invention will achieve control over deceleration of the flywheel 70. In operating embodiments of the present invention, it is such control which achieves a longer duration signal from the sensor which keeps a modulator operating even though a vehicle wheel tends to become locked. The deceleration of the flywheel 70, in operating embodiments of this invention, is substantially constant as shown in FIG. 8.

Theoretical analysis and practical tests of sensors embodying the present invention have shown that the torque exerted on the decoupled flyweight by the yieldable coupling means in the form of band means is substantially independent of variations and inconsistencies in the frictional coefficient between the band means and the circumferential surface (as discussed more fully below). As simply stated above, the torque is equal to the product of the force of the torque control spring 79 and the distance between its attaching points on the arms 76, 78 and the center of the circumferential surface 74. More particularly, the torque control spring force necessary for a given deceleration of the flywheel can be approximated by the formula $$F = JD/R$$

where F is spring force in newtons, J is the flywheel moment of inertia in kilogram (meters)$^2$, R is the radial distance in meters from the center of rotation at which the spring acts, and D is the desired deceleration in radians per second$^2$.

Referring now more particularly to FIGS. 9 through 14, the interconnecting means of the present invention is there shown with one of the arms 76, 78 functioning in a manner similar to the radially directed pin 37 of the sensor of FIG. 1. As will be understood, the threshold torque required to cause yielding of the interconnecting means of the present invention is, in the embodiment of these figures, essentially independent of frictional coefficients and thus independent of such adhesion as often occurs between surfaces which are pressed against each other without sliding for an extended period of time. This is significant for use of the sensor of the present invention in braking control systems for automotive vehicles, where the sensor may be inactive during very extended periods of time.

The sensor of FIGS. 9 through 14 will be described in a form generally resembling the sensor of FIG. 1, for purposes of making the distinguishing characteristics of the present invention more clear. Accordingly, the sensor of FIGS. 9 through 14 is shown to have a pair of axial pins 80, 81 projecting from the disc 72 for cooperating with one arm 76 of the coil 75, generally as described hereinabove. The one arm 76 is normally maintained in engagement with a limit pin 81 by the force of an initial setting spring 82 connected between the one arm and the other pin 80 (FIG. 11). This condition is characteristic of the sensor of this invention during rotation of the flywheel 70 and disc 72 at a 1:1 ratio of rotational speeds such as at a in FIG. 8. A threaded screw 80a penetrating the pin 80 is provided for adjusting the tension of the initial setting spring 82.

As braking force is exerted on a corresponding vehicle wheel (as at e in FIG. 8), the torque exerted by the flywheel 70 relative to the disc 72 rises toward the threshold torque and the force exerted by the initial setting spring 82 is overcome, permitting the one arm 76 to move toward an actuating pin 84 for a microswitch 85 (FIG. 12). As the rate of change of rotational speed of the vehicle wheel reaches the desired limit (between e and h in FIG. 8), the one arm 76 engages the actuating pin 84 and changes the conductive state of the microswitch 85, so as to signal an electrically actuated brake modulator (FIG. 13). Continued excessively steep deceleration of the vehicle wheel tends to unwind the coil 75, against the force exerted by the spring 79. With the one arm 76 restrained by the switch actuating pin 84, the other arm 78 is moved (clockwise in FIG. 14), decoupling the flywheel 70 and the disc 72 and accommodating relative rotation therebetween (as occurs immediately subsequent to h in FIG. 8).

Decoupling of the flywheel 70 and disc 72 continues as the rotational speed of the wheel drops substantially below the rotational speed which would be in the desired ratio with the rotational speed of the flywheel (thru j and k in FIG. 8) and until such time as a reversing rate of change in wheel rotational speed restores the disc 72 to the desired ratio with the flywheel 70 (as at 1 in FIG. 8). Upon the rotational speeds returning to the desired ratio, recoupling of the disc and flywheel occurs (FIG. 13) and the flywheel is accelerated, moving the sensor thru the positions of FIG. 12 to the position of FIG. 11. The cycle of movement from the positions of FIG. 11 to the positions of FIG. 14 and back is then repeated as necessary during continuance of braking or until the vehicle has been brought to a stand still.

It is contemplated that the arrangements specifically illustrated in FIGS. 9 through 14 may be varied while the principles of operation described above are retained. More particularly, it is deemed significant that there should be a rapid actuation of the sensor when the initial setting threshold torque is reached. Stated differently, it is desirable that the initial setting spring 82 against which the one arm 76 must move in actuating an electrical switch have a very small or negative spring constant. Desirably, the force exerted in restraining the arm 76 should decrease rapidly as that arm moves away from its normal position. One approach contemplated as achieving this characteristic is to rely upon magnetic attraction between two relatively moveable elements such as the limit pin 81 and the one arm 76, with or without the use of an additional spring 82. As will be understood, as soon as a small air gap is opened between such elements (as in FIG. 12), the restraining force acting on the one arm decreases rapidly. Other approaches may become apparent to persons of skill in the machine design arts.

It is additionally contemplated that the interconnecting means which has been herein described with reference to the coil 75 may take such other forms as hysteresis or magnetic particle devices controlled by permanent magnets, electro-magnets or some combination producing known or controllable magnetic fields. Other mechanical or electromechanical alternatives capable of accommodating the operation described hereinabove will be apparent to skilled machine designers.

From the above discussion, it will be apparent to persons skilled in the applicable arts that separate provision has been made for an initial setting and a torque control setting. It is to be noted as a significant feature of this invention that means are provided for governing the exertion on the decoupled flyweight of a torque resisting rotation of the flyweight which closely controls the rate of deceleration thereof so as to obtain a substantially constant rate. This characteristic feature of the present invention is to be accomplished by any interconnecting means selected for this invention and is entirely distinct from delay arrangements such as the frictional clutches and brakes briefly mentioned hereinabove.

In the latter connection, the prior art sensor of FIG. 1 has been described as a most convenient introduction to the present invention, with the recognition that other prior sensors using mechanical delay arrangements may superficially appear related to this invention. Such other prior sensors have included frictional clutches for decoupling a flyweight so that the decoupled flyweight may rotate faster than a flyweight driving means. Some such other sensors have provided separate brakes for the decoupled flyweight in attempts to control the rate of deceleration thereof. The clutches and brakes disclosed have included conventional frictional face clutches normally held closed with a constant force, ratchet clutches and coil one-way clutches.

Clutches and brakes of those types employed by such prior sensors invariably give rise to torques which are extremely inconsistent and are proportional to variations in coefficients of friction and thus subject to significant further inconsistency. The considerable differences inherent in and between starting friction and slipping friction and which also arise out of possible disuse and exposure to various conditions of temperature, lubrication, sliding speed and cleanliness can be noted from the discussion of clutch characteristics in any standard machine designer's handbook. In addition to suffering the inherent disadvantage of inconsistency of torques exerted, disclosures of prior sensors neither recognize nor teach controlled or substantially constant flyweight deceleration nor the desirability of means as contemplated by the present invention which are capable of accomplishing the operation described hereinabove.

It is additionally contemplated that signalling may be accomplished by means other than the microswitch and actuating pin described to this point. More particularly, where magnetic fields are relied upon, the possibility is opened that a reed switch may be employed to respond to particular positions of magnetic elements. Further, other alternatives may be used, such as a camming arrangement which responds to occurrences of relative rotation by movement of some element axially of the shaft 71.

In one operating embodiment of a sensor in accordance with this invention, a cast iron flywheel having a weight of 1.40 kilograms was used. That flywheel had an outside diameter of 150 millimeters, an inner diameter of 40 millimeters and a width of 12 millimeters. It was desirable that the controlled braking system exert a braking force to be controlled within narrow limits and not to exceed an effective moment of $8.82 \times 10^{-2}$ Nm. As applied to a vehicle where slip values were desired to be held within the range of about 10 percent to about 30 percent and with a greater slip value for the front wheels than for the rear wheels, the tolerance ranges necessarily were so small that overlapping was not to be permitted where the threshold torque for the front wheel sensors is at a minimum value and for the rear wheel sensors is at a maximum value. In a test vehicle, these requirements necessitated front wheel sensors responsive at $10.80 \times 10^{-2} \pm 0.49 \times 10^{-2}$ Nm and rear wheel sensors responsive at $7.85 \times 10^{-2} \pm 0.49 \times 10^{-2}$ Nm. Desirably, the initial setting torque for the sensor should be adjusted to be as close as possible under the desired limit value for the torque control setting, which additionally illustrates the desirability of maintaining close tolerance ranges.

It will be understood that the flywheel of this specific operating embodiment is relatively large and that the nominal values and tolerances ranges may vary proportionately with changes of moment of inertia of the flywheel. Rotation at a known ratio other than 1:1 (as described more fully hereinafter) may additionally be used to vary the nominal values and tolerance ranges at which a sensor operates.

Other operating embodiments of sensors in accordance with this invention have been used with suitable modulators on test vehicles to produce graphs of actual vehicle wheel rotational speeds corresponding to the diagram of FIG. 8. As will be noted from the figure, the rotational speed of a controlled wheel follows a variable frequency curve, with the frequency of that curve varying in response to and in accordance with frictional conditions between the wheel and a road surface. Experimental results have shown that, in a 4-second braking sequence over a road surface that was one-half wet and one-half dry, the sensor of the present invention in combination with a preferred modulator reviewed and recalculated the frequency of such a curve 20 times, providing necessary and differing delay times at each recalculation. In a similar braking sequence where the road surface was dry, the sensor recalculated differing delay times 40 times in 3 seconds.

Other experimental results with a sensor adjusted for flyweight deceleration corresponding to a vehicle deceleration of substantially 1g. have shown that sudden full application of brakes on a slippery surface and at a vehicle speed of 50 M.P.H. will give a sensor signal duration of 2 seconds while the wheel comes to a complete stop or locked condition in less than 0.2 second. From 25 M.P.H., the sensor signal duration is approximately one second and the time to wheel lock approximately 0.1 second. Acceleration of a locked wheel back to vehicle speed (or 0% slip) requires approximately one second for a vehicle speed of 50 M.P.H. on a slippery surface. Acceleration times may increase or decrease in proportion to vehicle speed but can be substantially doubled by differences between dry road surfaces and slippery surfaces.

These experimental results clearly demonstrate that sensors according to this invention will allow braked wheels to accelerate to desired slip values under any road conditions but additionally indicate that the torque control setting should be maintained within narrow limits.

In order to make more clear the range of yielding couplings which attain the characteristics of this invention as described above, three alternatives have been illustrated in FIGS. 15 thru 17 to which attention is now directed. The arrangement of FIG. 15 most nearly approaches that of FIGS. 9 thru 14 and will, accordingly, be first described. Structural elements of the sensor of FIG. 15 having substantial similarity to structural elements of the sensor of FIG. 9 have been identified by comparable reference characters with the addition of prime notation.

The sensor of FIG. 15 includes a bridging member 90 supported on the flyweight 70' for rotation relative thereto about the center of the shaft 71'. Mounted on the bridging member 90 for rotation about its own axis is a pivot pin 91 operatively connected with an initial setting spring 82' and a torque control spring 79' by radially directed pins or arms 76', 78'. Rotation of the pin 91 about its axis tightens and slackens a flexible element (preferably a synthetic, non-stretchable filament) functioning as a wound band means 75' (note FIG. 16). The operation of the sensor of FIG. 15 accords fully with the operation described hereinabove with reference to FIGS. 8 thru 14.

The sensor of FIG. 17 substantially resembles the sensor of FIG. 15, and structural elements having substantial similarity have been identified by comparable reference characters with the addition of double prime notation. The sensor of FIG. 17 differs from the sensor of FIG. 15 in that rotation of the pin 91" acts through a crank arm 92 to lift a shoe member 94 from engagement with the circumferential surface 74" of the flyweight 70". During operation of the sensor of FIG. 17, the engagement between the shoe member 94 and the circumferential surface 74" is a fluttering or clapping engagement at an exceedingly high frequency, thereby accomplishing the exertion of a controlled torque in the manner contemplated for this invention and substantially identical to repeated quick winding and unwinding of the coil 75 as described above with reference to FIGS. 9 thru 14.

Figure 18:
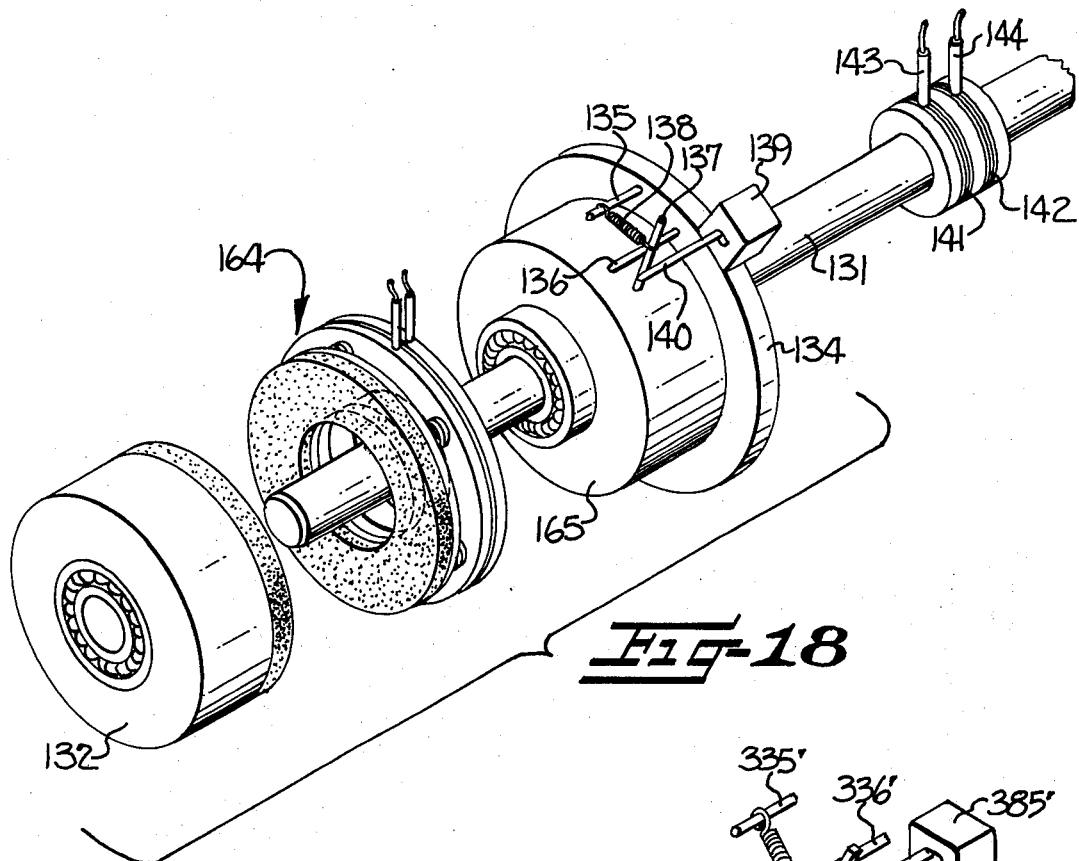
FIG. 18 is an exploded perspective view of yet another modified form of the sensor of FIG. 9.

Yet another approach to quickly repeated cycles of engagement and disengagement is illustrated in FIG. 18 where structural elements substantially similar to elements with the sensor of FIG. 1 have been designated by comparable reference characters of the 100 order series. The distinction between the arrangement of FIGS. 18 and 1 lies in the insertion of an electromagnetic device 164 between the flyweight 132 and a carrier 165 for the radial pin 137 which controls actuation of the microswitch 139. By suitable connection of the electromagnetic device 164 with the switch 139, the flyweight 132 may be decoupled from and recoupled with the carrier 165 to achieve operation in accordance with this invention. As will be appreciated, the electromagnetic device 164 may also be used in conjunction with any of the arrangements of FIGS. 2 thru 5 and may be repeated by other coupling devices provided that decoupling and recoupling at the necessary frequencies can be attained.

Sensors in accordance with the present invention, as discussed hereinabove, have operated with flyweights normally rotatable at a 1:1 ratio with rotation of a vehicle wheel or other rotatable element. The present invention contemplates, however, that the ratio of rotational speeds may be other than 1:1, and forms of sensors in accordance with the present invention which so operate are illustrated more particularly in FIGS. 19–23 of the accompanying drawings.

Turning first to a sensor illustrated in FIG. 19, it will be noted that the means interconnecting a shaft 171 (drivingly connected with a rotatable element such as a vehicle wheel) and a flyweight 170 includes a planetary gearing arrangement generally indicated at 186. The planetary gearing arrangement 186 includes a sun gear 187 fixed to an interconnecting shaft 188 for transmitting rotation to a disc member 172 on which is mounted a microswitch 185 having an operating pin 184. Flyweight 170 has a radially projecting pin 137 normally biased into engagement with a limit pin 136 by a restraining spring 138 which connects the radial pin 137 with a second pin 135 extending from the disc 172. The structural elements of the sensor of FIG. 19 described hereinabove will be noted as having substantial similarity to structural elements of other sensors described hereinabove which have been identified by comparator reference characters not having the 100 order designation.

The planetary gearing arrangement 186 additionally has three planet gears 189, each in engagement both with the sun gear 187 and with an orbit gear 190. The orbit gear 190 is fixed, while the planet gears 189 are driven in rotation by means of a yieldable coupling. More particularly, each of the planet gears 189 is mounted on a corresponding planet gear stub shaft 191 extending from a band encircled member 192. The band encircled member 192 defines a circumferential surface 174 which is engaged by band means 175. Further, the rotatable element 192 is mounted for rotation relative to the shaft 171. The band means 175 has a pair of radially extending arms 176, 178 and a biasing spring 179 acting therebetween. One of the arms, illustrated to be the one arm 176, is fixed relative to a disc member 193 by a pair of axially extending pins 194, 195 straddling and entrapping the one arm 176.

As will be understood, the flyweight 170 is normally driven in rotation at a known ratio of rotational speeds by the transmission of rotation from shaft 171 through the band means 175, rotatable element 192, planetary gearing arrangement 186, and interconnecting shaft 188. One preferred ratio has been for the flyweight 170 to normally rotate in a ratio of 5:1 to a vehicle wheel. In the event that operation in accordance with a sequence of events as described above with particular reference to FIGS. 8–14 is necessitated, yielding of the interconnecting means occurs between the rotatable element 192 and the disc member 193 which are normally coupled by the band means 175.

A modification of the sensor in accordance with FIG. 19 is illustrated in FIG. 20, where comparable reference characters of a 200 order series have been employed. It will be noted that the distinction between the sensors of FIGS. 19 and 20 lies in the possibility of rotation of the orbit gear 290, which is encircled by the band means 275. The one arm 276 of the band means 275 which is secured against movement is engaged by stop pins 294, 295 which are fixed relative to the rotating elements of the sensor. The stub shafts 291 for the planet gears 289 are driven directly from the shaft 271. In operation, yielding of the interconnecting means is accomplished by permitting rotation of the orbit gear 290.

Yet another modification of a sensor in accordance with the present invention wherein the rotatable elements such as a vehicle wheel and the flyweight normally rotate at a known ratio other than 1:1 is illustrated in FIG. 21, where reference characters of a 300 order series are employed. As there illustrated, a microswitch 385 is mounted on a disc member 372 which rotates with a shaft 372 operatively connected with a rotatable element such as a vehicle wheel. By such a placement of the microswitch, and cooperation thereof with one arm 376 of a band means 375 mounted on a rotatable element 392 which drives the planet gears 389, the flyweight 370 may be fixed to the intermediate shaft 388 while achieving operation in accordance with the principles of the present invention.

Another form of sensor which combines certain features of the sensors of FIGS. 20 and 21 is shown in FIG. 22, where structural elements comparable to the structural elements of the sensor of FIG. 21 have been identified by the same reference characters with the addition of prime notation. The distinction between the arrangements of FIGS. 21 and 22 lies in the mounting of the pins 335', 336' and microswitch 385' stationarily relative to other elements of the sensor, thereby obviating the need for slip rings or the like.

Persons familiar with the operation of gearing arrangements such as the planetary gear trains 186, 286, 386, 386' and 486 will be aware of the torque multiplication effects of such transmissions. Where an up-gearing is employed, torques and rates of change of rotational speed are magnified proportionally. Torques are then magnified again before reaching the yieldable coupling coming back through the planetary gearing. Such magnification and the possibilities shown above for selection of coupling locations facilitate use of small flywheels while still providing torques in usable ranges. Additionally, geared sensors may attain response times shorter than sensors operating at a normal ratio of 1:1.

The restraints imposed upon the one arms 176, 276, 376 of the sensor arrangements of FIGS. 15–23 are consistent with the sensors discussed hereinabove in the present specification and, in operation, essentially permit acceleration of a flyweight with an unlimited torque on recoupling (as, for example, from $l$ to $m$ in FIG. 8). In instances where a planetary gearing is employed, the present invention contemplates that protection be provided for the planetary gearing by effectively restricting the torque which may be transmitted thereto. Such an arrangement, as illustrated in FIG. 23 and now to be described, obtains other and further advantages as will be brought out more fully hereinafter.

As will be noted by comparison of FIGS. 19 and 23, the sensor of FIG. 23 bears substantial similarity to the sensor of FIG. 19 and comparator elements have been identified by comparable reference characters of the 400 order series in the latter figure. The distinction between the sensor constructions will be noted from the repositioning of the restraining pin 494 and the inclusion of an acceleration limiting spring 496 acting between the one arm 476 and the relocated pin 494. During operation as described hereinabove, the sensor of FIG. 23 functions in the manner of the sensors described hereinabove up to the point at which the accelerating rotatable element or vehicle wheel is recoupled with the flyweight (at 1 in FIG. 8). Upon recoupling, the one arm 476 of the band means 475 is moved away from the limit pin 495, while the other arm 478 is moved toward the repositioned limit pin 494. Upon exertion of a torque tending to accelerate rotation of the flyweight 470 and sufficient to overcome the force exerted by the spring 496, the other arm 478 would be moved into engagement with the relocated pin 494, permitting separation of the arms 476, 478 of the band means 475 against the combined force of the springs 479, 496 to again decouple the rotatable element and the flyweight. Stated differently, such yielding of the interconnecting weight establishes a limiting value for the accelerating torque.

Referring now more particularly to the diagrams of FIGS. 24–26, assuming hypothetically and for the purposes of the present discussion that no accelerating torque was delivered from a wheel to the flyweight, then the acceleration indicated by the displacement between $l$ and $m$ in FIG. 8 would not be present and such a portion of the curve would be essentially flat as indicated by the line o of the zero slope. By way of contrast, and through an arrangement such as that illustrated in FIG. 23, the present invention contemplates that the slope of such an intermediate line portion may be a controlled positive slope as indicated by the series of lines in FIG. 25. It is contemplated that persons of ordinary skill may utilize the sensor of FIG. 23 to achieve an acceleration for the flyweight which is independent of the acceleration of the vehicle wheel or other rotatable element and of the absolute speed thereof at any moment of time. An example of such a choice is illustrated in FIG. 26, which is an enlarged illustration of a portion of FIG. 8, modified to demonstrate two distinct braking conditions. The unbroken curve refers to braking of a vehicle on ice, and is therefore characterized in that the wheel very rapidly looses speed when the braking force applied is excessive, will only slowly recover speed when the braking force is relieved and again very rapidly looses speed when braking force is reapplied. The broken line curve represents braking on a dry road surface, and is characterized in that the speed of the wheel decreases at a more moderate rate when an excessive brake force is applied, rapidly increases when the brake force is relieved and again moderately decreases when braking force is reapplied. Under such circumstances, the sensors of FIGS. 9 through 22 result in cycles of decoupling and recoupling which relieve braking force at $p$ and at $q$, respectively. Braking action will thus be seen to take place at a higher slip percentage on an iced road rather than on a dry road. With the control over accelerating torque transmittal accomplished by the arrangement of FIG. 23, as shown by the lines $r$ and $s$ in FIG. 26, the sensor signal for dry road conditions is displaced from $q$ to $t$, bringing the continuation of the downwardly cycling curve closer to that for iced road conditions. It should be noted that the curved of FIG. 26 have been somewhat simplified for the sake of clarity and ready understanding.

Acceleration torque control is applicable also to sensors in which the normal ratio of rotation is 1:1, as indicated by the sensor shown in FIGS. 28 and 29. Elements of the sensor of FIGS. 28 and 29 corresponding to elements described hereinabove have been identified by common reference characters of a 500 order series. As will be noted, the sensor of FIGS. 28 and 29 uses the spring 596 to accomplish the function served by the pins 36, 36', 136, 236 etc. in the sensors of prior Figures. To that end, the spring 538, 596 are provided with open sided hooks (FIG. 29) to accommodate relative movement of the arm 576 in one direction. The spring 596 preferably is manufactured with internal prestress and is stiffer than the spring 538.

Another form of sensor in accordance with this invention is shown in FIG. 27 and is constructed to act both as an acceleration sensor and a deceleration sensor, functioning in both directions of relative rotation of a flywheel 670 with respect to a disc 672. Where elements common with those described hereinabove are shown, 600 series notation is employed.

As will be understood, the flyweel 670, together with the coil 675 is able, without resistance other than the friction with the ball bearing to rotate through a small angle in either direction relative to the disc 672 until one of the arms 676, 678 of the coil is stopped by one of a pair of hooks 687A, 697B attached thereto. Initial setting springs 638A, 638B act on the arms 676, 678 by means of the hooks 697A, 697B and are compressed between washers 698A, 698B and respective brackets 699A, 699B. Threshold moments for sensing acceleration and deceleration can be adjusted to different values in the two directions of relative rotation by choosing different forces to be exerted by the two coil springs 638A, 638B. The two springs 638A, 638B are normally prestressed by the provision of stop means in the form of washers 697C. However, the inertia of the flywheel 670 is equal in both directions.

For certain applications, for example with vehicles having automatic system for both brake and acceleration control, it is desirable to have differing adjustments for sensing acceleration and deceleration not only insofar as the spring force adjustment is concerned but also with regard to inertia adjustments. One manner of accomplishing such a differentiation in inertia adjustments is indicated in FIG. 30, where the flyweight includes first and second masses. One mass comprises the flywheel 770 described hereinabove. However, a projection 740 has been attached thereto by means of suitable fasteners 739. On projection 740 is a ball bearing 741 on which is mounted a second flywheel 742. By means of suitable one-way clutch means, preferably in the form of a helically wound coil 743 fixed at one end to the second flywheel 742, the first and second masses are operatively coupled together for rotation at a common rotational speed in one direction and operatively uncoupled for rotation of only one of the masses in the opposite direction. Thus, the acceleration or deceleration at which the interconnecting means afforded by the present invention decouples will be different depending on the direction in which the acceleration or deceleration is acting. Another manner of obtaining such differing adjustments may rely on duplication of interconnecting means operating with a particular disc, with each such interconnecting means cooperating with a corresponding flyweight and the flyweights possibly having different moments of inertia. Yet another approach to dual function sensors may arise from coupling together any two of the sensors described above by means of a suitable one-way clutch so that one sensor responds to acceleration and the other to deceleration.

It is to be further noted that relative rotation between the flyweight means and the drive means of sensors in accordance with this invention may be detected in manners distinct from the switch arrangements here shown, and is capable of being used to produce electrical signals having frequency and/or strength indicative of the relative rotational speeds thereof. One such approach would be to provide a flywheel with a toothed disc having a pitch correlated to the spacing between the arms of a magnet mounting coil and attached to the disc. As will be understood by persons familiar with electrical technology, an increase in relative rotation of the flywheel with regard to the disc would result in higher frequencies and voltages of current being obtained. Further, the pitch of the teeth of such a disc may be made asymmetrical, so as to produce a signal indicating the direction of rotation and providing control either for both acceleration and deceleration or differentiating with respect to the direction of movement of the vehicle.

In the drawings and specification, there has been set forth a preferred embodiment of the invention, and although specific terms are employed, they are used in a generic and descriptive sense only and not for purposes of limitation.

That which is claimed is:

1. In a braking system for a vehicle wheel and having anti-lock control means, and sensor means for actuating the anti-lock means including a flyweight coupled for rotation in response to wheel rotation and means operatively interconnecting the flyweight and the wheel for selectively decoupling the flyweight from the wheel upon a torque having a magnitude greater than a threshold magnitude being exerted therebetween as a result of a change in rotational speed of the wheel, the improvement in the interconnecting means comprising control means for limiting the rate of deceleration of the decoupled flyweight to a controlled, substantially constant rate.

2. In a braking system for a vehicle wheel and having anti-lock control means, and sensor means for actuating the anti-lock means including a flyweight coupled for rotation in response to wheel rotation and means operatively interconnecting the flyweight and the wheel for selectively decoupling the flyweight from the wheel upon a torque having a magnitude greater than a threshold magnitude being exerted therebetween as a result of a change in rotational speed of the wheel, the improvement in the interconnecting means comprising control means for controlling wheel slip and for maintaining it within a predetermined range.

3. A system according to claim 2 wherein said range is from about 10 – 30% wheel slip.

4. In a braking system for a vehicle wheel and having anti-lock control means, and sensor means for actuating the anti-lock means including a flyweight coupled for rotation in response to wheel rotation and means operatively interconnecting the flyweight and the wheel for selectively decoupling the flyweight from the wheel upon a torque having a magnitude greater than a threshold magnitude being exerted therebetween as a result of a change in rotational speed of the wheel, the improvement in the interconnecting means comprising control means for limiting the rate of deceleration of the decoupled flyweight to a predetermined rate.

5. A system of claim 4 wherein said control means frictionally engages said flyweight and limits the deceleration rate substantially independently of any changes in coefficient of friction between said flyweight and said control means.

6. In a braking system for a vehicle wheel and having anti-lock control means, and sensor means for actuating the anti-lock means including a flyweight coupled for rotation in response to wheel rotation and means operatively interconnecting the flyweight and the wheel for selectively decoupling the flyweight from the wheel upon a torque having a magnitude greater than a threshold magnitude being exerted therebetween as a result of a change in rotational speed of the wheel, the improvement in the interconnecting means comprising control means for applying substantially said same torque to said flyweight for limiting the rate of deceleration of the decoupled flyweight.

7. A system of claim 6 wherein said control means includes means for making said applied torque substantially constant.

8. In a braking system for a vehicle wheel and having anti-lock control means, and sensor means for actuating the anti-lock means including a flyweight coupled for rotation in response to wheel rotation and means operatively interconnecting the flyweight and the wheel for selectively decoupling the flyweight from the wheel upon a torque having a magnitude greater than a threshold magnitude being exerted therebetween as a result of a change in rotational speed of the wheel, the improvement in the interconnecting means comprising control means in frictional engagement with a surface rotating with the flyweight for limiting the rate of deceleration of the decoupled flyweight substantially independently of any changes in coefficient of friction between said flyweight and said control means.

9. In a braking system for a vehicle wheel and having anti-lock control means, and sensor means for actuating the anti-lock means including a flyweight coupled for rotation in response to wheel rotation and means operatively interconnecting the flyweight and the wheel for responding to an excessive rate of change of wheel rotation speed by decoupling the flyweight from the wheel and by accommodating simultaneous change in rotation of the wheel at the excessive rate of change and change in rotation of the flyweight at a lesser rate of change, the interconnecting means responding to reversal in the rate of change of wheel rotation and to rotation of the flyweight and the wheel at a known ratio of rotational speeds by recoupling the flyweight and the wheel, the improvement in the interconnecting means comprising control means for exerting on said flyweight while the same is decoupled a controlled torque resisting relative rotation between said interconnecting means and said flyweight at any ratio of rotational speeds other than said known ratio whereby successive decoupling and recoupling permits the rate of change of wheel rotation to be controlled by the rate of change of flyweight rotation.

10. In a braking system for a vehicle wheel and having anti-lock control means, and sensor means for actuating the anti-lock means including a flyweight rotatable in response to wheel rotation and rotatable means operatively interconnecting the flyweight and the wheel for yieldably coupling the same; the interconnecting means being normally coupled with the flyweight for common rotation of said interconnecting means and the flyweight, and being decoupled from the flyweight and accommodating decoupled rotation between the flyweight and the interconnecting means upon a torque having a magnitude greater than a threshold magnitude being exterted therebetween as a result of deceleration in rotational speed of the wheel, and being recoupled with the flyweight upon the interconnecting means and the flyweight again reaching common rotation as a result of acceleration in rotational speed of the wheel, the improvement wherein said interconnecting means comprises means for limiting the rate of deceleration of the decoupled flyweight to a controlled, substantially constant rate.

11. A system according to claim 10 wherein said interconnecting means includes means frictionally engaging a surface rotating with said flyweight for limiting the rate of deceleration of the decoupled flyweight to a controlled substantially constant rate substantially independently of any changes in coefficient of friction between said surface and said frictional engagement means.

12. A system according to claim 10 wherein the anti-lock means comprises electrically powered motive means and further wherein said sensor means comprises switch means electrically connected with said motive means for controlling the supply of electrically power thereto, said switch means being responsive to occurrences of decoupled rotation between the flyweight and said interconnecting means for actuating the anti-lock means as a result of deceleration in rotational speed of the wheel.

13. A system according to claim 10 wherein said interconnecting means comprises adjustable restraining means for controlling the threshold magnitude within narrow limits.

14. A system according to claim 10 wherein said interconnecting means comprises stick-slip frictional coupling means for normally restraining the flyweight against decoupled rotation with regard to said interconnecting means.

15. A system according to claim 14 wherein said interconnecting means further comprises biasing spring means for determining the restraining force normally exerted by said frictional coupling means.

16. A system according to claim 14 wherein the flyweight defines a circumferential surface and said frictional coupling means comprises means for engaging said circumferential surface.

17. A system according to claim 14 wherein said interconnecting means defines a circumferential surface and said frictional coupling means comprises means for engaging said circumferential surface.

18. A system according to claim 10 wherein said interconnecting means accommodates decoupled rotation between the flyweight and said interconnecting means in either rotational direction and further wherein said sensor comprises means for differentiating a first threshold magnitude for one rotational direction from a second threshold magnitude for the other rotational direction.

19. A system according to claim 18 wherein said means for differentiating threshold magnitudes comprises first and second restraining means for controlling the corresponding threshold magnitude within narrow limits.

20. A system according to claim 18 wherein said means for differentiating threshold magnitudes comprises an auxiliary flyweight and means for selectively coupling together the flyweight and said auxiliary flyweight in one rotational direction.

21. A system according to claim 10 wherein said interconnecting means comprises planetary gearing means for normally coupling the flyweight and the wheel for common rotation thereof at a constant ratio of rotational speeds other than 1.1 and having a sun gear, a planet gear and an orbit gear and further wherein one of said gears is operatively connected with the wheel to be driven thereby and another of said gears is operatively connected with the flyweight to drive the same.

22. A system according to claim 21 wherein the remaining one of said gears is fixed.

23. A system according to claim 21 wherein said interconnecting means further comprises adjustable restraining means for engaging the remaining one of said gears for controlling the threshold magnitude within narrow limits.

24. In a braking system for a vehicle wheel and having anti-lock control means and sensor means for actuating the control means including a flyweight rotatable in response to wheel rotation, the improvement in the sensor comprising rotatably means operatively interconnecting the flyweight and the wheel for yieldably coupling the same; said interconnecting means being normally coupled with the flyweight for common rotation of said interconnecting means and flyweight, and being decoupled from the flyweight and accommodating decoupled rotation between the flyweight and said interconnecting means upon a torque having a magnitude greater than a threshold magnitude being exerted therebetween as a result of deceleration in rotational speed of the wheel, and being recoupled with the flyweight upon said interconnecting means and the flyweight again reaching common rotation as a result of acceleration in rotational speed of the wheel; and said interconnecting means comprising adjustable restraining means operatively connected with the flyweight for controlling the threshold magnitude within narrow limits.

25. In a braking system for a vehicle wheel and having anti-lock means, and sensor means for actuating said anti-lock means in response to the rate of change of changing rotational speeds of a vehicle wheel, the improvement wherein said sensor means comprises a flyweight rotatable in response to wheel rotation, and rotatable means operatively interconnecting said flyweight and the wheel for yieldably coupling the same; said interconnecting means comprising frictional means for normally coupling with said flyweight for rotation of said interconnecting means and said flyweight at a known ratio of rotational speeds, and further comprising actuating means operable with said frictional means for decoupling said frictional means from said flyweight and accommodating decoupled rotation between said flyweight and said interconnecting means upon a torque having a magnitude greater than a threshold magnitude being exerted therebetween as a result of deceleration in rotational speed of the wheel, and further comprising restraining means operatively connected with said frictional means and cooperting with said actuating means for limiting the rate of deceleration of said decoupled flyweight to a controlled, substantially constant rate, said frictional means recoupling with said flyweight upon said interconnecting means and said flyweight again reaching the known ratio of rotational speeds as a result of acceleration in rotational speed of the wheel and accelerating said recoupled flyweight to restore rotational speed lost during controlled deceleration thereof.

26. A system according to claim 25 wherein said frictional means engages a surface rotating with said flyweight for limiting the rate of deceleration of the decoupled flyweight to a controlled substantially constant rate substantially independently of any changes in coefficient of friction between said surface and said frictional means.

27. A system according to claim 25 wherein said flyweight defines a right circular cylindrical surface and further wherein said frictional means comprises means for exerting on the cylindrical surface a torque resisting decoupled rotation of the flyweight.

28. A system according to claim 27 wherein said frictional means comprises band means extending along the cylindrical surface, and said restraining means for yieldably biasing said band means into engagement with the cylindrical surface and thereby for controllably exerting torque thereon.

29. A system according to claim 28 wherein said band means encircles the cylindrical surface and has first and second arm portions extending from respective ends of said band means, and further wherein said restraining means comprises spring means acting between said arm portions for biasing said arm portions toward one another.

30. In a braking system for a vehicle wheel and having anti-lock control means, and sensor means for actuating said anti-lock means in response to the rate of change of changing rotational speeds of a vehicle wheel, the improvement wherein said sensor means comprises a flyweight rotatable in response to wheel rotation and defining a right circular cylindrical surface, and rotatable means operatively interconnecting said flyweight and the wheel for yieldably coupling the same; said interconnecting means comprising band means encircling said cylindrical surface for normally coupling with said flyweight for rotation of said interconnecting means and said flyweight at a known ratio of rotational speeds, and further comprising actuating means operable with said band means for decoupling said band means from said flyweight and accommodating decoupled rotation between said flyweight and said interconnecting means upon a torque having a magnitude greater than a threshold magnitude being exerted therebetween as a result of deceleration in rotational speed of the wheel, and further comprising restraining means operatively connected with said band means and cooperating with said actuating means for limiting the rate of deceleration of said decoupled flyweight to a controlled, substantially constant rate, said band means recoupling with said flyweight upon said interconnecting means and said flyweight again reaching the known ratio of rotational speeds as a result of acceleration in rotational speed of the wheel and accelerating said recoupled flyweight to restore rotational speed lost during controlled deceleration thereof.

31. A system according to claim 30 wherein said band means comprises a flexible metallic band having a circular cross-section nd encircling said circumference with a plurality of turns.

32. A system according to claim 31 wherein the anti-lock means comprises electrically powered motive means and further wherein said metallic band has first and second arm portions extending from respective ends thereof and further wherein said actuating means comprises first and second stop means for engaging said arm portions and thereby for facilitating decoupling and recoupling of said metallic band and said flyweight, at least one of said stop means being an electrical switch means electrically connected with said motive means for controlling the supply of electrical power thereto, said switch means being responsive to occurrences of decoupled rotation between said flyweight and said interconnecting means for actuating the anti-lock means as a result of deceleration in rotational speed of the wheel.

33. A system according to claim 32 wherein said actuating means comprises first spring means operatively connected with one arm portion of said metallic band for controllably determining the magnitude of torque necessary for decoupling of said flyweight and said restraining means comprises second spring means operatively connected between said arm portions of said metallic band for controllably determining the rate of deceleration to which said decoupled flyweight is limited.

34. In a system for controlling rotation of a rotatable element and having control means, and sensor means for actuating the control means including a flyweight coupled for rotation in response to rotation of the rotatable element and means operatively interconnecting the flyweight and the rotatable element for responding to a predetermined rate of change of rotatable element rotation speed by decoupling the flyweight from the rotatable element and by accommodating simultaneous change in rotation of the rotatable element at the predetermined rate of change and change in rotation of the flyweight at a lesser rate of change, the interconnecting means responding to reversal in the rate of change of rotatable element rotation and to rotation of the flyweight and the rotatable element at a known ratio of rotational speeds by recoupling the flyweight and the rotatable element, the improvement in the interconnecting means comprising means for exerting on the flyweight while the same is decoupled a controlled torque resisting relative rotation between said interconnecting means and said flyweight at any ratio of rotational speeds other than said known ratio whereby successive decoupling and recoupling permits the rate of change of rotatable element rotation to be controlled by the rate of change of flyweight rotation.

35. A system according to claim 34 wherein said last named means maintains substantially constant the torque exerted on the flyweight independently of any fluctuation in flyweight rotational speed.

36. In a system for controlling rotation of a rotatable element and having control means and sensor means for actuating the control means in response to the rate of change of changing rotational speeds of a vehicle wheel, the improvement wherein said sensor means comprises a flyweight rotatable in response to rotatable element rotation and means operatively interconnecting said flyweight and the rotatable element for yieldably coupling the same; said interconnecting means comprising frictional means for normally coupling with said flyweight for rotation of said interconnecting means and said flyweight at a known ration of rotational speeds, and further comprising actuating means operable with said frictional means for decoupling said frictional means from said flyweight and accommodating decoupled rotation between said flyweight and said interconnecting means upon a torque having a magnitude greater than a threshold magnitude being exerted therebetween as a result of deceleration in rotational speed of the rotatable element, and further comprising restraining means operatively connected with said frictional means and cooperating with said actuating means for limiting the rate of deceleration of said decoupled flyweight to a controlled, substantially constant rate, said frictional means recoupling with said flyweight upon said interconnecting means and said flyweight again reaching the known ratio of rotational speeds as a result of acceleration in rotational speed of the rotatable element and accelerating said recoupled flyweight to restore rotational speed lost during controlled deceleration thereof.

37. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, the improvement comprising control means for limiting the rate of deceleration of the decoupled flyweight to a controlled, substantially constant rate.

38. A sensor according to claim 37 wherein said control means includes means frictionally engaging a surface rotating with said flyweight for limiting the rate of deceleration of the decoupled flyweight to a controlled substantially constant rate substantially independently of any changes in coefficient of friction between said surface and said frictional engagement means.

39. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, the improvement comprising means for exerting on the flyweight a predetermined torque resisting decoupled rotation of the flyweight.

40. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, the improvement comprising means for exerting on the flyweight a substantially constant torque resisting decoupled rotation of the flyweight.

41. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, the improvement comprising control means for limiting the rate of deceleration of the decoupled flyweight to a predetermined rate.

42. A sensor according to claim 41 wherein said control means frictionally engages said flyweight and limits the deceleration rate substantially independently of any changes in coefficient of friction between said flyweight and said control means.

43. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, the improvement comprising control means for applying substantially the same said torque to said flyweight for limiting the rate of deceleration of the decoupled flyweight.

44. A sensor according to claim 43 wherein said control means includes means for making said applied torque substantially constant.

45. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, the improvement comprising control means in frictional engagement with a surface rotating with said flyweight for limiting the rate of deceleration of the decoupled flyweight substantially independently of any changes in coefficient of friction between said flyweight and said control means.

46. In a sensor for responding to the rate of change of changing rotational speeds of a vehicle wheel and including a flyweight coupleable for rotation in response to wheel rotation, and means operatively interconnected with the flyweight for responding to a predetermined rate of change of wheel rotation speed by decoupling the flyweight from the wheel and by accommodating simultaneous change in rotation of the wheel at the predetermined rate of change and change in rotation of the flyweight at a lesser rate of change, said interconnecting means responding to reversal in the rate of change of wheel rotation and to rotation of the flyweight and the wheel at a known ratio of rotational speeds by recoupling the flyweight and the wheel, the improvement wherein said interconnecting means comprises means for limiting the rate of change of change in rotation of the flyweight to a controlled, substantially constant rate whereby successive decoupling and recoupling permits the rate of change of wheel rotation to be controlled by the rate of change of flyweight rotation.

47. In a sensor for responding to the rate of change of changing rotational speeds of a vehicle wheel and including a flyweight coupleable for rotation in response to wheel rotation, and rotatable means operatively interconnected with the flyweight for yieldably coupling the same; said interconnecting means being normally coupled with the flyweight for common rotation of said interconnecting means and the flyweight, and being decoupled from the flyweight and accommodating decoupled rotation between the flyweight and said interconnecting means upon a torque having a magnitude greater than a threshold magnitude being exerted therebetween as a result of deceleration in rotational speed of the wheel, and being recoupled with the flyweight upon said interconnecting means and the flyweight again reaching common rotation as a result of acceleration in rotational speed of the wheel, the improvement wherein said interconnecting means comprises means for limiting the rate of deceleration of the decoupled flyweight to a controlled, substantially constant rate.

48. A sensor according to claim 47, wherein said interconnecting means comprises adjustable restraining means for controlling the threshold magnitude within narrow limits.

49. A sensor according to claim 47 wherein said interconnecting means comprises stick-slip frictional coupling means for normally restraining the flyweight against decoupled rotation with regard to said interconnecting means.

50. A sensor according to claim 49 wherein said interconnecting means further comprises biasing spring means for determining the restraining force normally exerted by said frictional brake means.

51. A sensor according to claim 49 wherein the flyweight defines a circumferential surface and said frictional coupling means comprises means for engaging said circumferential surface.

52. A sensor according to claim 49 wherein said interconnecting means defines a circumferential surface and said frictional coupling means comprises means for engaging said circumferential surface.

53. A sensor according to claim 47 wherein said interconnecting means accommodates decoupled rotation between the flyweight and said interconnecting means in either rotational direction and further wherein said sensor comprises means for differentiating a first threshold magnitude for one rotational direction from a second threshold magnitude for the other rotational direction.

54. A sensor according to claim 53 wherein said means for differentiating threshold magnitudes comprises first and second restraining means for controlling the corresponding threshold magnitude within narrow limits.

55. A sensor according to claim 53 wherein said means for differentiating threshold magnitudes comprises an auxiliary flyweight and means for selectively coupling together the flyweight and said auxiliary flyweight in one rotational direction.

56. A sensor according to claim 47 wherein said interconnecting means comprises planetary gearing means for normally coupling the flyweight and the wheel for common rotation thereof at a constant ratio of rotational speeds other than 1:1 and having a sun gear, a planet gear and an orbit gear and further wherein one of said gears is operatively connected with the wheel to be driven thereby and another of said gears is operatively connected with the flyweight to drive the same.

57. A sensor according to claim 56 wherein the remaining one of said gears is fixed.

58. A sensor according to claim 56 wherein said interconnecting means further comprises adjustable restraining means for engaging the remaining one of said gears for controlling the threshold magnitude within narrow limits.

59. In a sensor for responding to the rate of change of changing rotational speeds of a vehicle wheel and including a flyweight coupleable for rotation in response to wheel rotation, the improvement comprising rotatable means operatively interconnected with the flyweight for yieldably coupling the same; said interconnecting means comprising frictional means for normally coupling with the flyweight for common rotation of said interconnecting means and the flyweight, and further comprising actuating means operable with said frictional means for decoupling said frictional means from the flyweight and accommodating decoupled rotation between the flyweight and said interconnecting means upon a torque having a magnitude greater than a threshold magnitude being exerted therebetween as a result of deceleration in rotational speed of the wheel, said frictional means and said actuating means cooperating for recoupling said frictional means with the flyweight upon said interconnecting means and the flyweight again reaching common rotation as a result of acceleration in rotational speed of the wheel; and said interconnecting means further comprising adjustable restraining means operatively connected with said frictional means for controlling the threshold magnitude within narrow limits.

60. A sensor for responding to the rate of change of changing rotational speeds of a vehicle wheel and comprising a flyweight coupleable for rotation in response to wheel rotation, and rotatable means operatively interconnected with said flyweight for yieldably coupling the same; said interconnecting means comprising frictional means for normally coupling with said flyweight for rotation of said interconnecting means and said flyweight at a known ratio of rotational speeds, and further comprising actuating means operable with said frictional means for decoupling said frictional means from said flyweight and accommodating decoupled rotation between said flyweight and said interconnecting means upon a torque having a magnitude greater than a threshold magnitude being exerted therebetween as a result of deceleration in rotational speed of the wheel, and further comprising restraining means operatively connected with sad frictional means and cooperating with said actuating means for limiting the rate of deceleration of said decoupled flyweight to a controlled, substantially constant rate, said frictional means recoupling with said flyweight upon said interconnecting means and said flyweight again reaching the known ratio of rotational speeds as a result of acceleration in rotational speed of the wheel and accelerating said recoupled flyweight to restore rotational speed lost during controlled deceleration thereof.

61. A sensor according to claim 60 wherein the flyweight defines a right circular cylindrical surface and further wherein said frictional means comprises means for exerting on the cylindrical surface a torque resisting decoupled rotation of the flyweight.

62. A sensor according to claim 61 wherein said frictional means comprises band means extending along the cylindrical surface, and said restraining means comprises means for yieldably biasing said band means into engagement with the cylindrical surface and thereby for controllably exerting torque thereon.

63. A sensor according to claim 62 wherein said band means encircles the cylindrical surface and has first and second arm portions extending from respective ends of said band means, and further wherein said restraining means comprises spring means acting between said arm portions for biasing said arm portions toward one another.

64. A sensor for responding to the rate of change of changing rotational speeds of a vehicle wheel and comprising a flyweight coupleable or rotation in response to wheel rotation and defining a right circular cylindrical surface, and rotatable means operatively interconnected with said flyweight for yieldably coupling the same; said interconnecting means comprising band means encircling said cylindrical surface for normally coupling with said flyweight for rotation of said interconnecting means and said flyweight at a known ratio of rotational speeds, and further comprising actuating means operable with said band means for decoupling said band means from said flyweight and accommodating decoupled rotation between said flyweight and said interconnecting means upon a torque having a magnitude greater than a threshold magnitude being exerted therebetween as a result of deceleration in rotational speed of the wheel, and further comprising restraining means operatively connected with said band means and cooperating with said actuating means for limiting the rate of deceleration of said decoupled flyweight to a controlled, substantially constant rate, said band means recoupling with said flyweight upon said interconnecting means and said flyweight again reaching the known ratio of rotational speeds as a result of acceleration in rotational speed of the wheel and accelerating said recoupled flyweight to restore rotational speed lost during controlled deceleration thereof.

65. A sensor according to claim 64 wherein said band means comprises a flexible metallic band having a circular cross-section and encircling said circumference with a plurality of turns.

66. A sensor according to claim 65 wherein the said metallic band has first and second arm portions extending from respective ends thereof and further wherein said actuating means comprises first and second stop means for engaging said arm portions and thereby for facilitating decoupling and recoupling of said metallic band and said flyweight, at least one of said stop means being an electrical switch means for controlling the supply of electrical power, said switch means being responsive to occurrences of decoupled rotation between said flyweight and said interconnecting means as a result of deceleration in rotational speed of the wheel.

67. A sensor according to claim 66 wherein said actuating means comprises first spring means operatively connected with one arm portion of said metallic band for controllably determining the magnitude of torque necessary for decoupling of said flyweight and said restraining means comprises second spring means operatively connected between said arm portions of said metallic band for controllably determining the rate of deceleration to which said decoupled flyweight is limited.

68. In a method of controlling braking of a vehicle wheel which includes driving a rotatable flyweight from the wheel and controllably varying braking force in response to a comparison of rates of change of rotation speeds of the wheel and the flyweight, the improvement comprising decoupling the wheel and the flyweight in response to occurrences of excessive rates of change of wheel rotation speed, accommodating simultaneous change of rotation of the wheel at the excessive rate of change and of the flyweight at a lesser rate of change while limiting the rate of deceleration of the flyweight to a controlled, substantially constant rate and while controllably varying braking force; recoupling the wheel and the flyweight in response to occurrences of both reversal of the rate of change of wheel rotation and to rotation of the flyweight and the wheel at a known ratio of rotational speeds; and repeating successive steps of decoupling and recoupling as required to control the rate of change of wheel rotation speed.

69. In a method of controlling rotation of a vehicle wheel which includes driving a rotatable flyweight from the wheel and controllably varying rotation of the wheel in response to a comparison of rates of change of rotation speeds of the wheel and the flyweight; the improvement comprising decoupling the wheel and the flyweight in response to occurrences of excessive rates of change of wheel rotation speed; accommodating simultaneous change of rotation of the wheel at the excessive rate of change and of the flyweight at a lesser rate of change while limiting the rae of deceleration of the flyweight to a controlled, substantially constant rate and while controllably varying rotation of the wheel; recoupling the wheel and the flyweight in response to occurrences of reversal of the rate of change of wheel rotation and to rotation of the flyweight and the wheel at a known ratio of rotational speeds; and repeating successive steps of decoupling and recoupling as required to control the rate of change of wheel rotation speed.

70. In a method of controlling rotation of a rotatable element which includes driving a rotatable flyweight from the rotatable element and controllably varying rotation of the rotatable element in response to a comparison of rates of change of rotation speeds of the rotatable element and the flyweight; the improvement comprising decoupling the rotatable element and the flyweight in response to occurrences of excessive rates of change of rotatable element rotation speed; accommodating simultaneous change of rotation of the rotatable element at the excessive rate of change and of the flyweight at a lesser rate of change while limiting the rate of deceleration of the flyweight to a controlled, substantially constant rate and while controllably varying rotation of the rotatable element; recoupling the rotatable element and the flyweight in response to occurrences of reversal of the rate of change of rotatable element rotation and to rotation of the flyweight and the rotatable element at a known ratio of rotational speeds; and repeating successive steps of decoupling and recoupling as required to control the rate of change of rotatable element rotation speed.

71. In a method of controlling braking of a vehicle wheel which includes driving a rotatable flyweight from the wheel through an interconnecting device and controllably varying braking force in response to a comparison of rates of change of rotation speeds of the wheel and the flyweight, the improvement comprising (a) normally coupling the flyweight and the interconnecting device for rotation at a known ratio of rotational speeds, (b) adjustably determining within narrow limits a threshold magnitude of torque effective for decoupling the flyweight and the interconnecting device upon exertion of torque therebetween, (c) decoupling the interconnecting device from the flyweight and accommodating decoupled rotation between the flyweight and the interconnecting device upon a torque having a magnitude greater than the threshold magnitude being exerted therebetween as a result of deceleration in rotational speed of the wheel, and (d) recoupling the interconnecting device with the flyweight upon the same again reaching the known ratio of rotational speeds as a result of acceleration in rotational speed of the wheel.

72. In a method of controlling rotation of a vehicle wheel which includes driving a rotatable flyweight from the wheel through an interconnecting device and controllably varying rotation of the wheel in response to a comparison of rates of change of rotation speeds of the wheel and the flyweight, the improvement comprising (a) normally coupling the flyweight and the interconnecting device for rotation at a known ratio of rotational speeds, (b) adjustably determining within narrow limits a threshold magnitude of torque effective for decoupling the flyweight and the interconnecting device upon exertion of torque therebetween, (c) decoupling the interconnecting device from the flyweight and accommodating decoupled rotation between the flyweight and the interconnecting device upon a torque having a magnitude greater than a threshold magnitude being exerted therebetween as a result of the rate of change of rotational speed of the wheel, and (d) recoupling the interconnecting device with the flyweight upon the same again reaching the known ratio of rotational speeds as a result of an opposite change in the rate of change of rotational speed of the wheel.

73. In a method of controlling rotation of a rotatable element which includes driving a rotatable flyweight from the rotatable element through an interconnecting device and controllably varying rotation of the rotatable element in response to a comparison of rates of change of rotational speeds of the rotatable element and the flyweight, the improvement comprising (a) normally couling the flyweight and the interconnecting device for rotation at a known ratio of rotational speeds, (b) adjustably determining within narrow limits a threshold magnitude of torque effective for decoupling the flyweight and the interconnecting device upon exertion of torque therebetween, (c) decoupling the interconnecting device from the flyweight and accommodating decoupled rotation between the flyweight and the interconnecting device upon a torque having a magnitude greater than a threshold magnitude being exerted therebetween as a result of the rate of change of rotational speed of the rotatable device, and (d) recoupling the interconnecting device with the flyweight upon the same again reaching the known ratio of rotational speeds as a result of an opposite change in the rate of change of rotational speed of the rotatable element.

74. In a method for sensing deceleration of a wheel comprising the steps of normally coupling a flyweight to the wheel through an interconnecting device, decoupling the flyweight from the interconnecting device when the rate of deceleration of the wheel exceeds a threshold value whereby the flyweight rotates at a different and higher speed than that of the interconnecting device, and recoupling the flyweight and the interconnecting device when the interconnecting device speeds back up and reaches the speed of the flyweight, the improvement comprising limiting the rate of deceleration of the flyweight to a controlled, substantially constant rate.

75. The method according to claim 74 wherein the step of limiting the rate of flyweight deceleration comprises frictionally engaging the flyweight and limiting its rate of deceleration substantially independently of any change in coefficient of friction between the flyweight and the rate controlling means.

76. The method according to claim 74 wherein the step of limiting the rate of flyweight deceleration comprises encircling a cylindrical circumference of the flyweight with an expandable and contractable plural wound flexible band.

77. The method according to claim 74 wherein the step of limiting the rate of flyweight deceleration comprises adjustably controlling the deceleration rate.

78. In a braking system for a vehicle wheel and having an anti-lock control and a sensor for actuating said anti-lock control in response to the rate of change of changing rotational speeds of a vehicle wheel, said sensor having a rotating shaft operatively connected with the wheel and a flyweight rotatable relative to said shaft, the improvement in the sensor comprising frictional means having coupling surfaces for normally interconnecting said shaft and said flyweight, initial setting means operatively connected with said frictional means for normally resisting relative rotation between said flyweight and said shaft, actuating means operable with said frictional means for separating said coupling surfaces and thereby for decoupling said flyweight and said shaft, said actuating means decoupling said flyweight when torques caused by changing rotational speeds of the wheel and acting on said flyweight exceed a predetermined threshold torque between said shaft and said flyweight, and restraining means operatively connected with said frictional means and cooperating with said actuating means for controlling said threshold torque within narrow limits, said aforementioned means cooperating for permitting said flyweight to rotate against said threshold torque while said rotationally caused torques exceed said threshold torque and for exerting said threshold torque on said rotating flyweight by a high frequency stick-slip action.

* * * * *

UNITED STATES PATENT OFFICE
CERTIFICATE OF CORRECTION

Patent No. 4,061,212  Dated December 6, 1977

Inventor(s) Folke Ivar Blomberg

It is certified that error appears in the above-identified patent and that said Letters Patent are hereby corrected as shown below:

Page 1 at INID Code [30] delete "1974" and insert therefor
  - 1975 -;
Page 1 at INID Code [30] delete "7401882" and insert therefor
  - 7501882 -;
Column 1, Line 54 delete "that" and insert therefor - than -;
Column 2, Line 61 delete "flywheel" and insert therefor
  - flyweight -;
Column 3, Line 1 delete "flywheel" and insert therefor
  - flyweight -;
Column 3, Line 35 delete "state" and insert therefor - stated -;
Column 5, Line 61 following "microswitches" delete "59" and
  insert therefor - 58 -;
Column 15, Line 34 delete "repeated" and insert therefor
  - replaced -;
Column 15, Line 62 delete "comparator" and insert therefor
  - comparable -;
Column 16, Line 47 delete "372" and insert therefor - 371 -;
Column 17, Line 47 delete "weight" and insert therefor
  - means -;
Column 18, Line 24 delete "curved" and insert therefor
  - curves -;
Column 18, Line 36 delete "spring" and insert therefor
  - springs -;
Column 18, Line 50 delete "with" and insert therefor - within -;
Column 18, Line 53 delete "687A" and insert therefor - 697A -;
Column 18, Line 66 delete "system" and insert therefor
  - systems -;
Column 21, Line 52 delete "electrically" and insert therefor
  - electrical -;
Column 22, Line 51 delete "rotatably" and insert therefor
  - rotatable -;

(continued)

UNITED STATES PATENT OFFICE
CERTIFICATE OF CORRECTION

Patent No. 4,061,212      Dated December 6, 1977

Inventor(s) Folke Ivar Blomberg

It is certified that error appears in the above-identified patent and that said Letters Patent are hereby corrected as shown below:

Column 22, Line 55 following "means and" insert - the -;
Column 23, Line 2 following "anti-lock" insert - control -;
Column 23, Line 45 following "restraining means" insert
    - comprises means -;
Column 24, Line 21 delete "nd" and insert therefor - and -;
Column 29, Line 18 delete "or" and insert therefor - for -;
Column 30, Line 33 delete "rae" and insert therefor - rate -;
Column 31, Line 48 delete "couling" and insert therefor
    - coupling -.

Signed and Sealed this

Second Day of May 1978

[SEAL]

Attest:

RUTH C. MASON
Attesting Officer

LUTRELLE F. PARKER
Acting Commissioner of Patents and Trademarks